United States Patent
Abramovici et al.

(10) Patent No.: US 10,504,265 B2
(45) Date of Patent: Dec. 10, 2019

(54) METHODS, SYSTEMS AND TOOLS FOR 3D ANIMATION

(71) Applicant: Blue Sky Studios, Inc., Greenwich, CT (US)

(72) Inventors: Daniel Abramovici, New York, NY (US); Elvis Au, Bayside, NY (US); Jonathan King, Forest Hills, NY (US); Ron Klasky, Westport, CT (US); James Wilkinson, Redondo Beach, CA (US)

(73) Assignee: BLUE SKY STUDIOS, INC., Greenwich, CT (US)

( * ) Notice: Subject to any disclaimer, the term of this patent is extended or adjusted under 35 U.S.C. 154(b) by 0 days.

(21) Appl. No.: 15/557,922

(22) PCT Filed: Mar. 17, 2016

(86) PCT No.: PCT/US2016/022758
§ 371 (c)(1),
(2) Date: Sep. 13, 2017

(87) PCT Pub. No.: WO2016/149446
PCT Pub. Date: Sep. 22, 2016

(65) Prior Publication Data
US 2018/0061108 A1  Mar. 1, 2018

Related U.S. Application Data

(60) Provisional application No. 62/134,238, filed on Mar. 17, 2015.

(51) Int. Cl.
*G06T 13/20* (2011.01)
*G06T 19/20* (2011.01)
(Continued)

(52) U.S. Cl.
CPC .............. *G06T 13/20* (2013.01); *G06T 15/20* (2013.01); *G06T 19/20* (2013.01); *H04N 13/128* (2018.05)

(58) Field of Classification Search
CPC .............................. G06T 13/20; H04N 13/128
See application file for complete search history.

(56) References Cited

U.S. PATENT DOCUMENTS 6,538,654 B1   3/2003   Rose et al.
6,608,624 B1   8/2003   Wang
(Continued)

OTHER PUBLICATIONS

International Application No. PCT/US2016/022758 International Search Report and Written Opinion dated Aug. 18, 2016, 19 pages.
(Continued)

*Primary Examiner* — Grace Q Li
(74) *Attorney, Agent, or Firm* — Cantor Colburn LLP

(57) ABSTRACT

Systems, tools and methods for 3D animation provided including: creating stereoscopic effect in 3D animation in a shot; determining maximum parallax in 3D animation; representation of stereo effect on a non-stereoscopic monitor in 3D animation; producing a digital contact sheet created for viewing in 3D animation; correcting for holes created by missing pixel information from a left camera perspective in 3D animation; real-time compositing of multiple stereo camera views in 3D animation; and emulation of multi-cam rig in 3D animation.

10 Claims, 25 Drawing Sheets

(51) Int. Cl.
*G06T 15/20* (2011.01)
*H04N 13/128* (2018.01)

(56) References Cited

U.S. PATENT DOCUMENTS

| | | | |
|---|---|---|---|
| 8,508,550 | B1 | 8/2013 | Jenny |
| 8,928,673 | B2 | 1/2015 | Wilkinson |
| 2003/0231179 | A1 | 12/2003 | Suzuki |
| 2004/0160640 | A1 | 8/2004 | Corrales et al. |
| 2006/0092154 | A1 | 5/2006 | Lee |
| 2006/0200253 | A1* | 9/2006 | Hoffberg .............. G05B 15/02 700/19 |
| 2007/0035619 | A1 | 2/2007 | Yoon |
| 2009/0128577 | A1 | 5/2009 | Gloudemans et al. |
| 2009/0160934 | A1 | 6/2009 | Hendrickson et al. |
| 2009/0174705 | A1 | 7/2009 | Martin |
| 2009/0219283 | A1 | 9/2009 | Hendrickson et al. |
| 2009/0262108 | A1 | 10/2009 | Davidson et al. |
| 2009/0262184 | A1 | 10/2009 | Engle et al. |
| 2010/0039429 | A1 | 2/2010 | Han |
| 2011/0157155 | A1 | 6/2011 | Turner et al. |
| 2012/0001906 | A1 | 1/2012 | Wilkinson |
| 2012/0176481 | A1 | 7/2012 | Lukk et al. |
| 2012/0224069 | A1 | 9/2012 | Aoki |
| 2013/0050437 | A1 | 2/2013 | Robinson |
| 2013/0124992 | A1 | 5/2013 | Lyons et al. |
| 2013/0135298 | A1 | 5/2013 | Isogai et al. |
| 2013/0187910 | A1 | 7/2013 | Raymond et al. |
| 2013/0258044 | A1 | 10/2013 | Betts-Lacroix |
| 2014/0036039 | A1* | 2/2014 | McNally .............. G06T 19/006 348/47 |
| 2014/0037190 | A1 | 2/2014 | Wang |
| 2014/0049536 | A1 | 2/2014 | Neuman et al. |
| 2014/0079313 | A1 | 3/2014 | Chen |
| 2014/0241612 | A1 | 8/2014 | Rhenmann et al. |

OTHER PUBLICATIONS

U.S. Appl. No. 13/174,642 Non-Final Office Action dated Apr. 14, 2017, 30 pages.

* cited by examiner

METHODS, SYSTEMS AND TOOLS FOR 3D ANIMATION

TECHNICAL FIELD

The present invention is generally related to computer animation. More particularly, example embodiments of the present invention are directed to methods, systems and tools for providing three-dimensional (3D) animation.

BACKGROUND OF THE INVENTION

Conventionally, motion picture production includes recording live-action footage and preparation of the footage for distribution. In contrast, conventional computer animation includes complex modeling of physical representations of objects/characters to be recorded, computer-interpretation of those models, and frame-by-frame rendering of movements of those models to mimic live-action recording of conventional movies. Thereafter, background features are added and post-processing may occur to render sharp detail.

To achieve 3D animation tasks are inherently more complex and there is a need in the art to provide methods and systems for 3D animation which reduce the complexity of animation while also increasing final quality.

SUMMARY

According to an example embodiment of the present invention, a system for 3-dimensional animation includes a computer apparatus, a means for display in communication with the computer apparatus, and a means for storage in communication with the computer apparatus. The means for storage is disposed to store data representing a 3D animation, the means for display is disposed to display a representation of the 3D animation, and the computer apparatus is configured to perform a method of 3D animation.

A first exemplary system, tool and method includes creating stereoscopic effect in 3D animation in a shot, including placing a stereo system screen (zps) into a scene for a desired effect, e.g., to accommodate for and identify offensive foreground geometry, automatically calculating an inter-axial separation between cameras so that background parallax matches a constant predetermined value, identification of any foreground objects according to one or more of: adjusting the zps to accommodate for smaller parallax in objects near a virtual camera followed by a return to automatically calculating an inter-axial separation between cameras so that background parallax matches a constant predetermined value; multi-rigging the shot so that foreground objects are isolated on their own camera rig, with compression of volume; and isolating foreground objects and treating them separately in post-production to reduce their volume; and publishing stereo camera rig settings into a pipeline, with scene elements placed in shot to maximize stereo effect.

A second exemplary system, tool and method includes determining maximum parallax in 3D animation, including identifying an object in a first frame at a threshold distance indicative of low parallax change and setting said object parallax value as a corresponding value for plural or all objects at and further than such distance. Further exemplary embodiments include, at a subsequent frame, identifying an object at a threshold distance indicative of low parallax change and setting object parallax value as a corresponding value for plural or all objects at and further than such distance in the subsequent frame.

A third exemplary system, tool and method includes representation of stereo effect on a non-stereoscopic monitor in 3D animation, including identifying key distances away from a stereo pair (stereo rig) of cameras based on details of the stereo rig, defining perpendicular planes at such key distances from the stereo rig as a function of such details, including one or more of: defining a stereo screen (zps) plane, defining a stereo safe plan, defining a stereo action safe plane, providing a user-defined plane, and defining a parallax falloff plan. Further exemplary embodiments include defining a volume bounded by the camera's frustum and the two stereo planes, the stereo action safe plane and the parallax fall of plane and rendering objects with this volume separately from each camera in the stereo pair.

A fourth exemplary system, tool and method includes producing a digital contact sheet created for viewing in 3D animation, including identifying frames produced for a shot, using compositing software, pulling selected frames from a show database into a digital contact sheet, and updating the digital contact sheet based upon recent produced frames. Further exemplary embodiments include pulling frames from a monoscopic pipeline for comparison with stereo frames.

A fifth exemplary system, tool and method includes correcting for holes created by missing pixel information, e.g., as a post render tool used for pixel remapping, from a left camera perspective in 3D animation, including identifying holes created by missing pixel information from a left camera perspective, implementing one or more of the following hole-filling techniques: pixel translating by copying an entire original image, translating the image slightly to the left or right, and layering underneath the original image; dilate filling by spreading color from one pixel to surrounding neighbors and layering underneath the original image; and side sampling by directly pulling color information from pixels nearest to a hole on the left and right of said hole; and applying results from one or more of the above techniques to fill holes in the image.

A sixth exemplary system, tool and method includes real-time compositing of multiple stereo camera views in 3D animation, including setting up a multi-rig configuration with set geometry isolated and assigned to groupings as a function of depth, with one grouping per stereo camera rig, compositing multiple stereo camera views in real time on a stereo view panel using mutipacking features, and adding or removing additional depth from parts of a shot and viewing in real time.

A seventh exemplary system, tool and method includes emulation of multi-cam rig in 3D animation, including setting up a single camera rig set up, calculating a base curve representing parallax change over zdepth, and redefining a portion of the base curve for one or more objects to create a 3D effect. Further exemplary embodiments include redefining the inter-axial value for a left-eye camera. In additional exemplary embodiments, such calculation is made according to: y=a/z+b, where y is parallax, z is geometry depth, a is a value calculated using interaxial and focal length, and b is a value calculated using zps depth.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views. Furthermore, each drawing contained in this provisional application includes at least a brief description thereon and associated text labels further describing associated details. The Figures.

DETAILED DESCRIPTION

Figure 1:
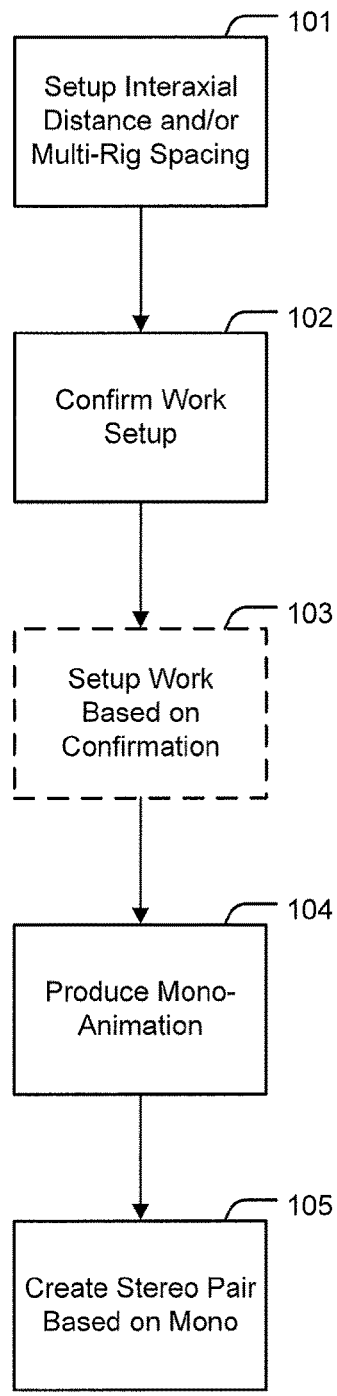
FIG. 1 depicts a method for 3D animation, according to example embodiments.

Further to the brief description provided above and associated textual detail of each of the figures, the following description provides additional details of example embodiments of the present invention.

Detailed illustrative embodiments are disclosed herein. However, specific functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments.

It will be understood that, although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting of example embodiments.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Hereinafter, example embodiments of the present invention will be described in detail.

Example embodiments of the present invention provide methods and systems for 3D animation which reduce the complexity of animation while also increasing final quality. According to example embodiments, methods and systems for 3D animation may be tailored for viewing by a particular audience. For example, an ocular distance for a wide range of viewing audiences may be taken into consideration during creation of the animation such that stereo pairs of frames are optimized for a target audience (e.g., children or adults). According to example embodiments, methods and systems for 3D animation may employ creation of a single camera view with a subsequent stereo paired view created based on the single camera view, thereby producing a stereo pair of frames for 3D viewing.

Moreover, according to example embodiments, methods and systems for 3D animation may employ creation of a multi-rig camera view with a subsequent stereo paired views created based on the multi-rig camera view and subsequent compositing of all views to produce an optimized stereo pair of frames for 3D viewing.

An exemplary method includes setting a first inter-axial distance between logical representations of a first set of two cameras, the first inter-axial distance optionally being configured to produce a desired 3D effect for a target audience, calculating a base curve representing parallax change over zdepth as defined by the setup of said first set of two cameras, the calculation made according to parallax, geometry depth, interaxial and focal length and zps depth, and selectively adjusting a resulting image by one or both of redefining the base curve and redefining the inter-axial value; as well as optionally setting a second inter-axial distance between logical representations of a second set of two cameras, the second inter-axial distance being based on the first inter-axial distance, setting a multi-rig spacing between the first and second sets of two cameras, the multi-rig spacing begin a value determined to reduce depth distortion effects in the 3D animation, and creating a stereoscopic frame set representing the 3D animation using the logical representations of the first and second sets of two cameras.

According to an example embodiment, a method for 3D animation includes setting a first inter-axial distance between logical representations of a first set of two cameras, the first inter-axial distance being configured to produce a desired 3D effect for a target audience, setting a second inter-axial distance between logical representations of a second set of two cameras, the second inter-axial distance being based on the first inter-axial distance, setting a multi-rig spacing between the first and second sets of two cameras, the multi-rig spacing begin a value determined to reduce depth distortion effects in the 3D animation, and creating a stereoscopic frame set representing the 3D animation using the logical representations of the first and second sets of two cameras with compositing of all views to produce an optimized stereo pair of frames for 3D viewing.

According to yet another example embodiment, a computer program product for 3D animation includes a tangible storage medium readable by a computer processor and storing instructions thereon that, when executed by the computer processor, direct the computer processor to perform a method. An exemplary method includes setting a first inter-axial distance between logical representations of a first set of two cameras, the first inter-axial distance optionally being configured to produce a desired 3D effect for a target audience, calculating a base curve representing parallax change over zdepth as defined by the setup of said first set of two cameras, the calculation made according to parallax, geometry depth, interaxial and focal length and zps depth, and selectively adjusting a resulting image by one or both of redefining the base curve and redefining the inter-axial value, and further optionally setting a second inter-axial distance between logical representations of a second set of two cameras, the second inter-axial distance being based on the first inter-axial distance, setting a multi-rig spacing between the first and second sets of two cameras, the multi-rig spacing begin a value determined to reduce depth distortion effects in the 3D animation, and creating a stereoscopic frame set representing the 3D animation using the logical representations of the first and second sets of two cameras.

Further, example embodiments relate to plural 3D animation systems, tools and methods as are described below.

One exemplary system, tool and method includes creating stereoscopic effect in 3D animation in a shot, including placing a stereo system screen (zps) into a scene for a desired effect, e.g., to accommodate for and identify offensive foreground geometry, automatically calculating an inter-axial separation between cameras so that background parallax matches a constant predetermined value, identification of any foreground objects according to one or more of: adjusting the zps to accommodate for smaller parallax in objects near a virtual camera followed by a return to automatically calculating an inter-axial separation between cameras so that background parallax matches a constant predetermined value; multi-rigging the shot so that foreground objects are isolated on their own camera rig, with compression of volume; and isolating foreground objects and treating them separately in post-production to reduce their volume; and publishing stereo camera rig settings into a pipeline, with scene elements placed in shot to maximize stereo effect.

Another exemplary system, tool and method includes determining maximum parallax in 3D animation, including identifying an object in a first frame at a threshold distance indicative of low parallax and setting said object parallax value as a corresponding value for plural or all objects at and further than such distance. Further exemplary embodiments include, at a subsequent frame, identifying an object at a threshold distance indicative of low parallax and setting object parallax value as a corresponding value for plural or all objects at and further than such distance in the subsequent frame.

Another exemplary system, tool and method includes representation of stereo effect on a non-stereoscopic monitor in 3D animation, including identifying key distances away from a stereo pair (stereo rig) of cameras based on details of the stereo rig, defining perpendicular planes at such key distances from the stereo rig as a function of such details, including one or more of: defining a stereo screen (zps) plane, defining a stereo safe plan, defining a stereo action safe plane, providing a user-defined plane, and defining a parallax falloff plan. Further exemplary embodiments include defining a volume bounded by the camera's frustum and the two stereo planes, the stereo action safe plane and the parallax fall of plane and rendering objects with this volume separately from each camera in the stereo pair.

Another exemplary system, tool and method includes producing a digital contact sheet created for viewing in 3D animation, including identifying frames produced for a shot, using compositing software, pulling selected frames from a show database into a digital contact sheet, and updating the digital contact sheet based upon recent produced frames. Further exemplary embodiments include pulling frames from a monoscopic pipeline for comparison with stereo frames.

Another exemplary system, tool and method includes correcting for holes created by missing pixel information from a left camera perspective in 3D animation, including identifying holes created by missing pixel information from a left camera perspective, implementing one or more of the following hole-filling techniques: pixel translating by copying an entire original image, translating the image slightly to the left or right, and layering underneath the original image; dilate filling by spreading color from one pixel to surrounding neighbors and layering underneath the original image; and side sampling by directly pulling color information from pixels nearest to a hole on the left and right of said hole; and applying results from one or more of the above techniques to fill holes in the image.

Another exemplary system, tool and method includes real-time compositing of multiple stereo camera views in 3D animation, including setting up a multi-rig configuration with set geometry isolated and assigned to groupings as a function of depth, with one grouping per stereo camera rig, compositing multiple stereo camera views in real time on a stereo view panel using mutipacking features, and adding or removing additional depth from parts of a shot and viewing in real time.

Another exemplary system, tool and method includes emulation of multi-cam rig in 3D animation, including setting up a single camera rig set up, calculating a base curve representing parallax change over zdepth, and redefining a portion of the base curve for one or more objects to create a 3D effect. Further exemplary embodiments include redefining the inter-axial value for a left-eye camera. In additional exemplary embodiments, such calculation is made according to: $y=a/z+b$, where y is parallax, z is geometry depth, a is a value calculated using interaxial and focal length, and b is a value calculated using zps depth.

Turning first to FIG. 1, according to an example embodiment of the present invention, a method 100 for 3D animation includes determining and/or setting up an inter-axial distance and/or multi-rig spacing at block 101. An ocular distance may be a measure corresponding to the separation between two eyes of a human. For example, a baseline ocular distance may be 2.0 for children of a target age group, while a baseline ocular distance may be 2.5 for average adults. The inter-axial distance is a measure of the virtual displacement between focal axes of a pair of virtual cameras arranged as a stereoscopic camera rig. The inter-axial distance may be based upon a target audience's ocular distance, or some derivation thereof. The multi-rig spacing is a measure of the virtual displacement between two or more virtual stereoscopic camera rigs. The multi-rig spacing may be based upon a depth or desired perceived depth of scenery to be rendered as a 3D animation for viewing by a target audience.

The method 100 may further include confirming a work set up at block 102. The work set up may be a set of computer settings, defaults, and/or selections which have been pre-selected for a desired animation project. The confirming may include determining if the inter-axial distance and/or multi-rig spacing is acceptable based on the computer settings, or if further adjustments may be necessary to produce a desired 3D effect.

The method 100 may further include setting up a work set up based on the confirmation at block 103. For example, if further adjustments are needed based on the confirming, additional selections, computer settings, or other changes may be made to produce a desired 3D effect.

The method 100 further includes producing a mono animation at block 104. For example, producing may include rendering a plurality of computer animation frames based on a desired or predetermined frame rate, the animation frames comprised of a desired number of pixels or being of a desired resolution. The producing may further include pre-processing, post-processing, editing, deleting, audio-integration, or any other suitable and/or necessary actions for producing a plurality of computer animation frames based on a single virtual camera view.

The method 100 further includes creating a stereo pair of frames based on the mono-animation. For example, creating may include using a computer model of the mono animation to render frames of a left or right perspective to the viewing angle of the mono animation's frames. For example, if the mono-animation includes a viewing angle of a right side (i.e., right eye), the creating includes creating accompanying left view (i.e., left eye) frames. If the mono-animation includes a viewing angle of a left side (i.e., left eye), the creating includes creating accompanying right view (i.e., right eye) frames. The left (or right) accompanying frames are produced taking into consideration the set up inter-axial distance for rendering of a precise viewing angle. In this manner, an accompanying frame for each of the plurality of frames for the mono animation is created, thereby producing a set of stereoscopic frames for producing a desired 3D effect when viewed.

The set of produced stereoscopic frames may be further edited, processed, altered, and/or otherwise manipulated according to any desired final effect(s) through a system for 3D animation.

Figure 2:
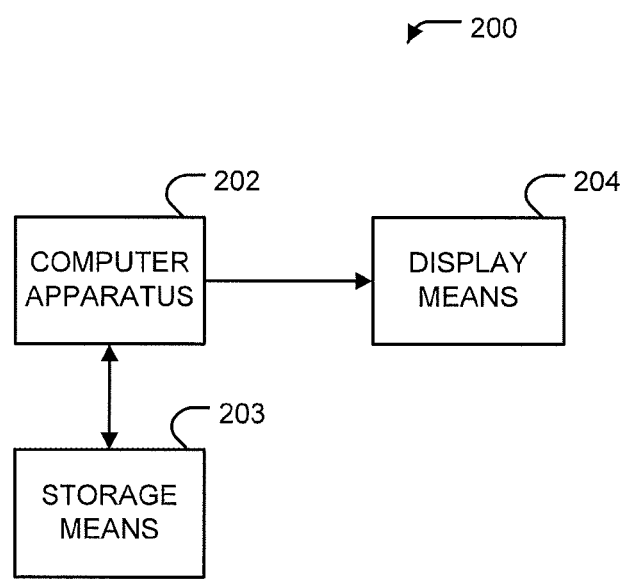
FIG. 2 depicts a system for 3D animation, according to example embodiments.

Hereinafter, a system for 3D animation is described with reference to FIG. 2.

The system 200 for 3D animation includes a computer apparatus 202. The computer apparatus may be any suitable computer apparatus including a server system, multi-processor system, personal computer, networked computing cluster, computing cloud, or any computer apparatus capable of practicing example embodiments.

The system 200 may further include a storage means 203 in communication with the computer apparatus 202. The storage means may be any suitable storage means disposed to store information related to 3D animation. The storage means may include a single storage element, or a plurality of storage elements. The storage means may be used in combination with any storage available on the computer apparatus 202, or may be omitted if suitable storage is available on the computer apparatus 202. The storage means 203 may include backup elements and/or recording elements. The recording elements may be disposed and configured to produce usable copies of any 3D animation produced at the computer apparatus. The usable copies are copies of a 3D animation which are viewable at a suitable apparatus. For example, a suitable apparatus may include a means for reading 3D animation data from a copy (DVD, double-reel film, recording media, etc). The suitable apparatus may also include means for displaying stereoscopic images/frames read from the 3D animation data. The displaying may include displaying left/right frames in parallel, successively, superimposed, or in any suitable fashion.

For example, if passive polarizing lenses are used for viewing the displayed frames, successive display of left/right frames polarized opposite to one-another may be suitable. Alternatively, the frames may be displayed side-by-side or otherwise separated and simultaneously. Other active techniques may be employed including "shuttered" glasses or lenses. Furthermore, additional passive techniques may be employed including red-cyan glasses or lenses. It is noted that exhaustive description of every possible combination of stereoscopic display is beyond the scope of this disclosure, and is omitted herein for the sake of brevity. The suitable apparatus may also include means for producing audio from the 3D animation data.

The system 200 may further include a display means 204 in communication with the computer apparatus 202. The display means 204 may be any suitable display, including a passive, active, or auto-stereoscopic 3D display (e.g., 3D-LCD, 3D-Plasma, 3D-computer monitor, lenticular screened display, parallax barrier screened display) or a conventional display (e.g., computer monitor, LCD, plasma, etc).

Hereinafter, detailed description of methodologies for creating 3D animation is provided.

3D Animation Process

Figure 3:
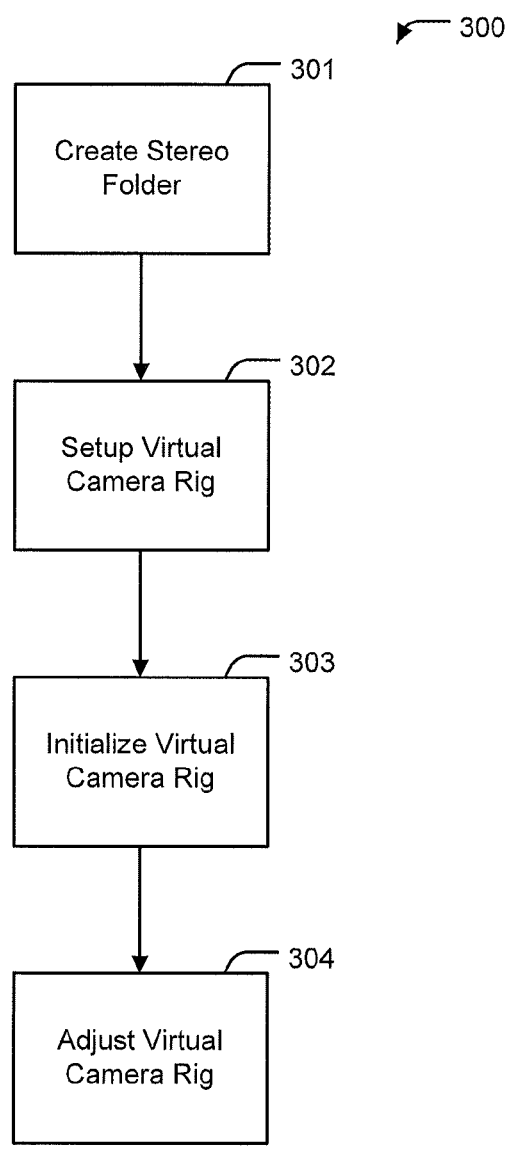
FIG. 3 depicts a method for 3D animation, according to example embodiments.

Turning to FIG. 3, a method for 3D animation is depicted. The method 300 includes creating a stereo storage folder at a computer apparatus at block 301. The stereo storage folder is configured to store information related to a stereoscopic pair of frames for a 3D animation sequence, and may include information related to inter-axial distance(s) for a stereoscopic pair of frames. Upon creation of the stereo storage folder, a work set up may be confirmed. For example, a rendering of a stereoscopic pair of frames may be viewed to confirm a desired 3D effect. The pair may be viewed side-by-side on a display means, over-and-under, or in any suitable fashion.

Thereafter, virtual stereoscopic camera rig is set up through computer software at a computer apparatus at block 303. The virtual stereoscopic camera rig is a first virtual camera in parallel with a main virtual camera, optionally separated at an inter-axial distance based on a desired ocular distance of a target viewing audience or a directed artistic look. The inter-axial distance may be set up previously to produce a desired 3D effect for the target viewing audience. The virtual stereoscopic camera rig is a logical representation of a real stereoscopic camera within computer software of a computer system. Through intelligent rendering, frames for a simulated 3D object/movie scene are rendered from a perspective equivalent to a real stereoscopic camera in a substantially similar physical layout. Therefore, a main camera and a duplicate camera may produce a logical representation of a real stereo-camera pair. This logical representation may be used to render stereoscopic frames. Furthermore, as described above, a mono-set of frames may be first produced, with the second set produced after initial rendering of the animation of one portion of frames.

Thereafter, the virtual stereoscopic camera rig is initialized in the computer software of the computer apparatus at block 303. Initialization may include activating a software object or initializing computer executable code segments which direct the computer apparatus to produce/render frames from the virtual stereoscopic camera rig.

As mentioned above, a display means may be configured to display a stereoscopic pair of images/frames to confirm work settings. Upon initialization of both the main camera and the duplicate camera, it may be desirable to re-confirm work settings using a display.

Thereafter, fine-tuning or adjustments to the camera pair may be made at block 304. For example, settings for the virtual camera pair may be adjusted to create a desired 3D effect. The settings may include a focal length, depth-field, volume of depth, desired axial separation, distance to object to be captured/recorded, distance to background area to be captured/recorded, as well as any other suitable settings including adjustment of inter-axial distance again.

As described above, a virtual stereoscopic camera rig may include logical representations of at least two cameras. Hereinafter, virtual stereoscopic camera rigs are described in detail with reference to FIGS. 4 and 5.

Stereoscopic Camera Rig Configuration and Animation

Figure 4:
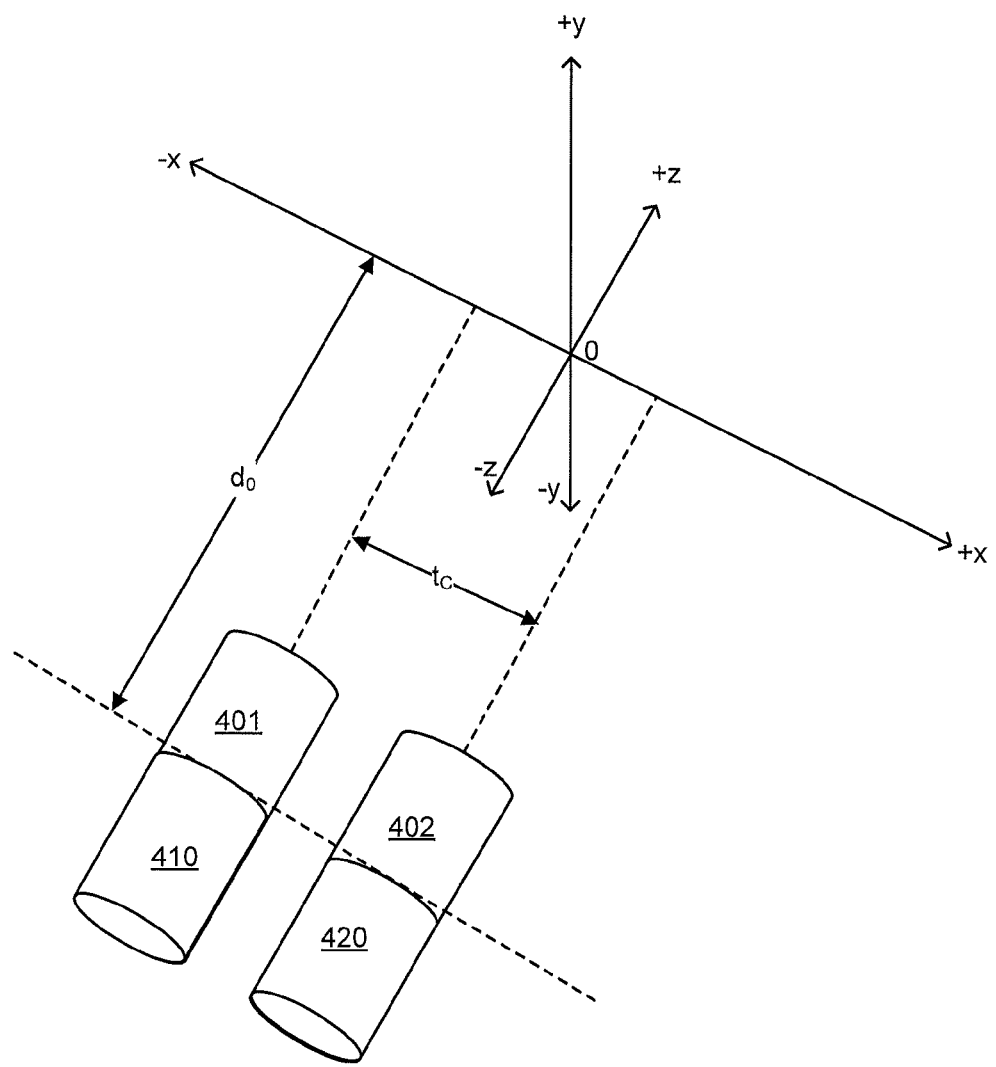
FIG. 4 depicts a virtual stereoscopic camera rig for 3D animation, according to example embodiments.

Turning to FIG. 4, a virtual stereoscopic camera rig is illustrated. The virtual stereoscopic camera rig may comprise a first virtual lens 401 and a second virtual lens 402 separated by an inter-axial spacing of tC. The virtual stereoscopic camera rig may further include a first virtual film plate 410 arranged proximate the first virtual lens 401. The first virtual film plate 410 is a logical representation of a real film plate or optical sensor for capturing video. The virtual stereoscopic camera rig may further include a second virtual film plate 420 arranged proximate the second virtual lens 402. The second virtual film plate 420 may be substantially similar to the first virtual film plate 410, or may be configured to perform differently according to any desired final 3D effect.

A recording plane of the virtual film plates is perpendicular to both virtual lens axes depicted. Furthermore, both virtual lens axes are parallel. It is apparent then that any images rendered from a distance d0 may produce a form of parallax. However, this parallax may be reduced and/or minimized through use of horizontal image translation. Such is illustrated in FIG. 5.

Figure 5:
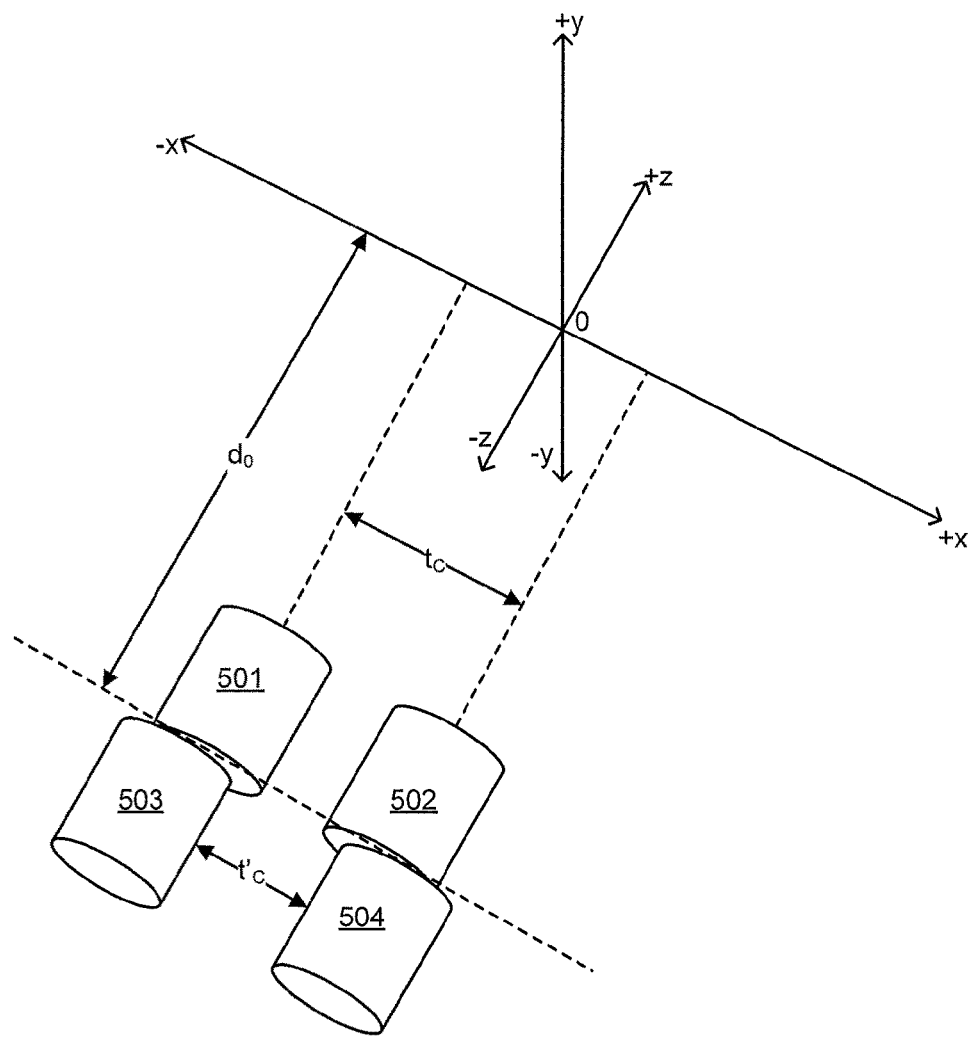
FIG. 5 depicts a virtual stereoscopic camera rig for 3D animation, according to example embodiments.

Turning to FIG. 5, an enhanced virtual stereoscopic camera rig is illustrated. The virtual stereoscopic camera rig may comprise a first virtual lens 501 and a second virtual lens 502 separated by an inter-axial spacing of tC. The virtual stereoscopic camera rig may further include a first virtual film plate 503 arranged proximate the first virtual lens 501. The first virtual film plate 503 is a logical representation of a real film plate or optical sensor for capturing video. The virtual stereoscopic camera rig may further include a second virtual film plate 504 arranged proximate the second virtual lens 502. The second virtual film plate 504 may be substantially similar to the first virtual film plate 503, or may be configured to perform differently according to any desired setting or final 3D effect.

A recording plane of the virtual film plates is perpendicular to both virtual lens axes depicted. Furthermore, both virtual lens axes are parallel. However, both virtual film plates are adjustable along the x-axis. The adjustment may be performed through computer software such that horizontal displacement of the virtual film plates encourages horizontal image translation. Through the use of horizontal image translation parallax may be changed.

By shifting the projection images through the use of the adjustable spacing of the virtual film plates, an observer has the ability to control the relative "out-of-screen" or "into-screen" parallax of objects in the scene. Typically the overall parallax effect is determined by a combination of the pre-rendering viewpoint separation step and post-rendering image shift step.

Overall parallax control may be achieved through a combination of both inter-axial distance manipulation and horizontal image shift adjustment. Increasing inter-axial distance widens the parallax between left and right views for greater overall depth effect. Compensating horizontal image shift values determine where the zero-parallax setting is located in a scene, and therefore serve to balance the out-of-screen and into-screen depth effects.

According to example embodiments, a user may adjust both inter-axial distance and horizontal image shift throughout the image synthesis process. The user would also be allowed to fine-tune both of these parallax parameters for optimal stereoscopic depth effects.

Using the horizontal shift adjustments described above, an enhanced 3D stereographic rendering may be produced by the virtual camera rigs adjusted at block 304 of method 300.

Thereafter, a minor sequence or short sequence of 3D animation may be rendered to re-confirm a desired 3D effect. For example, a short sequence including character motion, background motion, camera-panning, and/or other manipulation of portions of a virtual movie set and cameras may be produced. Thereafter, the short sequence may be viewed and/or confirmed.

Figure 6:
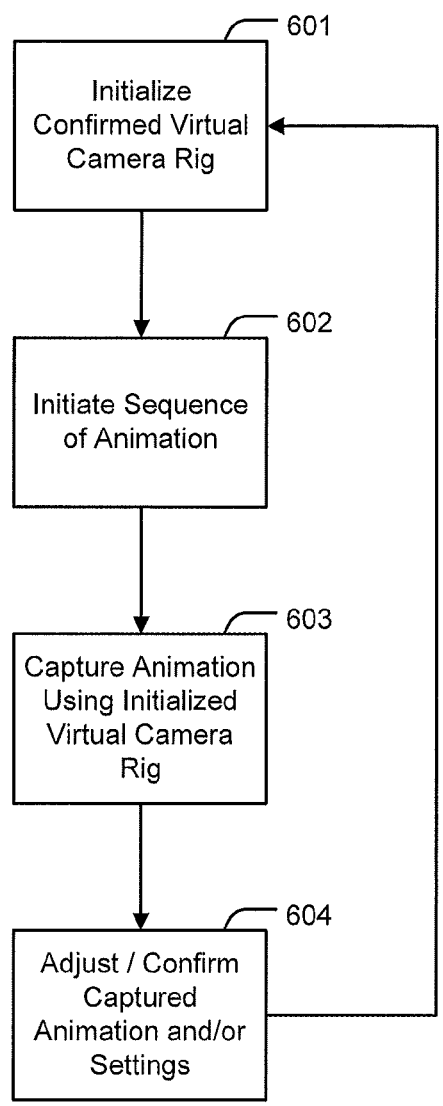
FIG. 6 depicts a method for 3D animation, according to example embodiments.

For example, as illustrated in FIG. 6, a method for producing 3D animation includes initializing a confirmed or previously adjusted virtual camera rig at block 601. Thereafter, a sequence of animation may be initiated at block 602 and captured using the initialized virtual camera rig at block 603. The initiating and capturing may include rendering a plurality of computer animation frames based on a desired or predetermined frame rate, the animation frames comprised of a desired number of pixels or being of a desired resolution. The initiating and capturing may further include recording, through the virtual camera rig, the animation in a similar fashion as to real-life recording. Further, pre-processing, post-processing, editing, deleting, audio-integration, or any other suitable and/or necessary actions for producing a plurality of computer animation frames may be performed at block 604.

Upon adjusting/confirming the captured animation, the method 600 may repeat as necessary to re-adjust settings and re-capture a desired 3D animation.

Thereafter, animation curves may be produced, and a final sequence or portion of a 3D animation may be produced. The animation curves may be set up through confirmation of a plurality of scene settings. The scene settings being logical representations of a physical set including elements rendered by the computer apparatus. For example, there may be a scene layout, scene background, characters, and animation of each, including any other suitable elements. Each of these settings may be checked/confirmed through short sequences as described above, or through real-time manipulation of the virtual stereo-camera pair described above. For example, the computer software may be configured to allow a user to control the panning/motion of the stereo-camera pair in relation to the scene, while at substantially the same time allowing for adjustment of any desired settings.

Upon confirmation, the final sequence or portion of the animation may be rendered, approved, and stored/edited.

This final sequence/animation may be stored in the stereo storage folder described above, or in another storage portion such that final approval, interim approval, or disapproval may be decided. If approved, the sequence may be stored for later editing and/or inclusion in a complete 3D animation. If interim/temporary approval is decided, the sequence may be stored and/or edited while other portions/sequences of a complete 3D animation are produced. If not approved, the entire sequence may be reproduced using different settings (described above).

Although termed "final" sequence or animation, it should be understood that the sequence may be further adjusted or edited using computer software/modeling to achieve a desired 3D effect.

Figure 7:
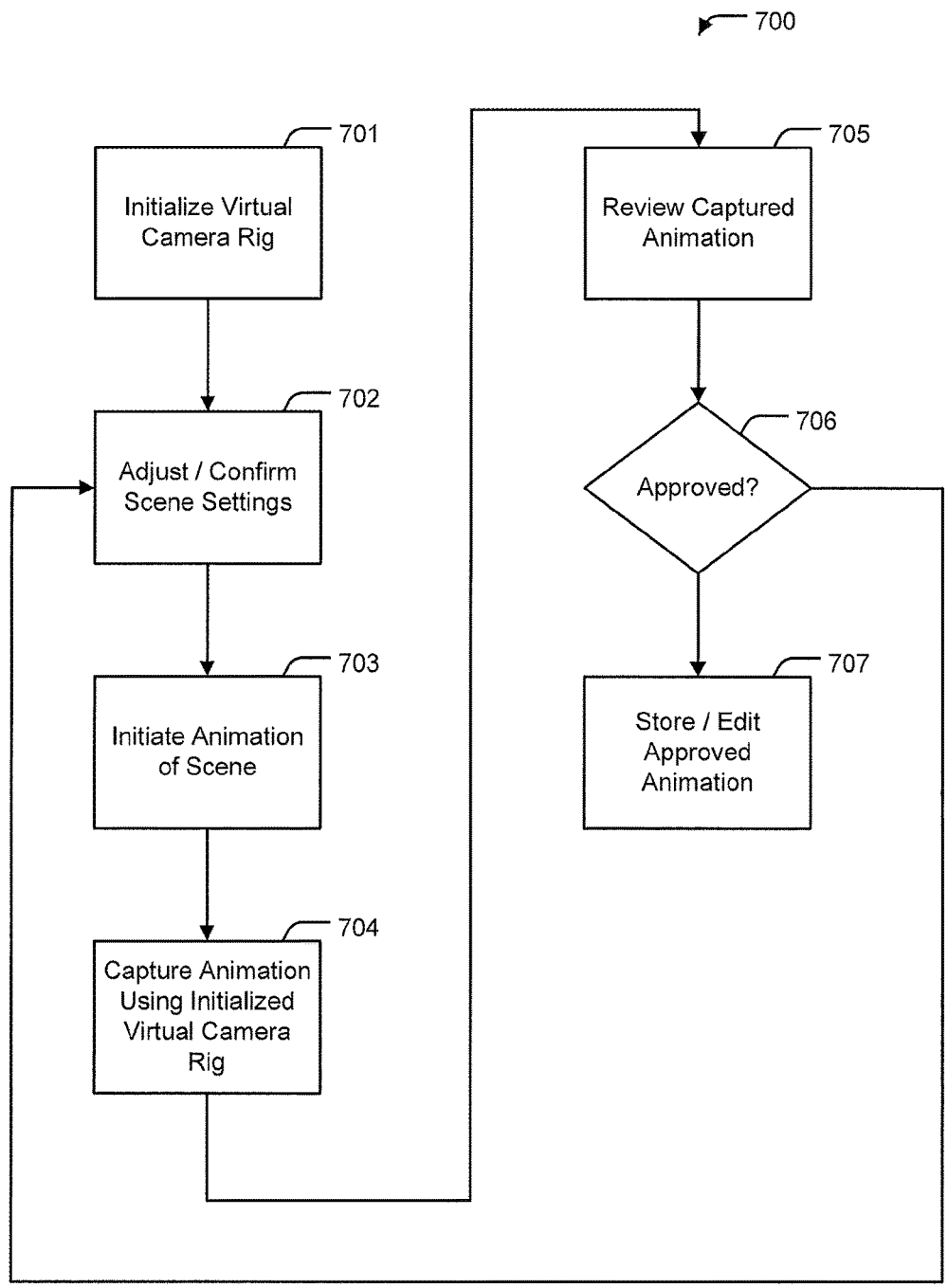
FIG. 7 depicts a method for 3D animation, according to example embodiments.

For example, FIG. 7 depicts a method for 3D animation including initializing a virtual camera rig at block 701. Thereafter, scene settings for a desired scene of a 3D animation may be adjusted/confirmed at block 702. Animation may be initiated at block 703 and captured using the initialized virtual camera rig at block 704. Upon capturing, the captured animation may be reviewed at block 705 and submitted to an approval process at block 706. The approval process may include viewing of the captured 3D animation by a director or sterographic director of the 3D animation and approval, interim-approval, or final approval given as described above. The approved 3D animation may then be stored for further editing or distribution at block 707. Furthermore, using information garnered through the approval process, additional settings may be adjusted and the method 700 may repeat at block 701 or 702.

It should be understood that although techniques for producing 3D animation have been described above which are somewhat similar to video capture through real stereoscopic cameras, the adjustments described for the exemplary virtual camera rigs provide for easier capture of 3D animation as compared to conventional rendering techniques. The adjustments for achieving a zero parallax setting are easily extensible across the 3D animation filmmaking process and a plurality of pre-configured virtual camera rigs may be created and stored as described above. It should also be appreciated that the reduction of parallax and easy adjustment of virtual camera rigs also allow for repetitious capture of different viewpoints of the same scenes in an animation, thereby allowing for adjustments otherwise not available in a real world scenario. Additionally, as should be understood in the art of stereoscopic video rendering, the depth of field and focal points for a plurality of background objects may introduce distortions in a final stereographic scene which hinder an audience's ability to enjoy a "real looking" or immersive viewing experience. However, example embodiments further provide methods for 3D animation which reduce these distortions through use of an exemplary virtual camera multi-rig.

Hereinafter, detailed description of methodologies for creating 3D animation with virtual camera multi-rigs is provided.

Multi-Rig Configuration and Animation

Figure 8:
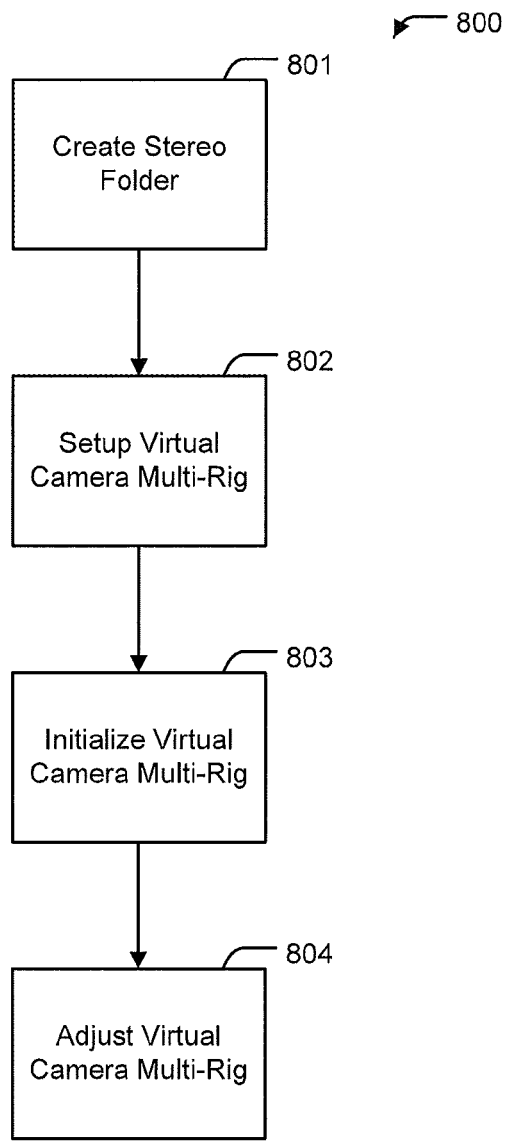
FIG. 8 depicts a method for 3D animation, according to example embodiments.

Turning to FIG. 8, a method for 3D animation is depicted. The method 800 includes creating a stereo storage folder at a computer apparatus at block 801. The stereo storage folder is configured to store information related to a plurality of related stereoscopic pairs of frames for a 3D animation sequence, and may include information related to inter-axial distance(s) and camera multi-rig separation for a plurality of related stereoscopic pairs of frames. The plurality of related stereoscopic pairs of frames are a set of at least two related pairs of stereoscopic frames of a scene for a 3D animation taken at different viewpoints, for example, by multiple virtual stereoscopic cameras arranged in differing virtual spatial relationships.

Upon creation of the stereo storage folder, a work set up may be confirmed. For example, a rendering of a plurality of related stereoscopic pairs of frames may be viewed to confirm a desired 3D effect. The pairs may be viewed side-by-side on a display means, over-and-under, or in any suitable fashion.

Thereafter, virtual stereoscopic camera multi-rig is set up through computer software at a computer apparatus at block 303. The virtual stereoscopic camera multi-rig comprises, at least, a first virtual camera in parallel with a second virtual camera, separated at an inter-axial distance based on a desired ocular distance of a target viewing audience; and a third virtual camera in parallel with a fourth virtual camera, separated at an inter-axial distance based on a desired ocular distance of a target viewing audience; wherein the first and second virtual cameras are separated from the third and fourth virtual cameras by the multi-rig spacing. The inter-axial distance may be set up previously at a desired setting or to produce a desired 3D effect (e.g., for a target viewing audience) and may be the same or different for both pairs of stereoscopic camera. The virtual stereoscopic camera rigs are logical representations of real stereoscopic cameras within computer software of a computer system. Through intelligent rendering, frames for a simulated 3D object/movie scene are rendered from a perspective equivalent to sets of real stereoscopic cameras in a substantially similar physical layout. Therefore, the virtual camera multi-rig may produce a logical representation of a real multiple stereo-camera pair. This logical representation may be used to render a plurality of related stereoscopic frames. Furthermore, as described above, a mono-set of frames may be first produced for each camera pair, with the second set produced after initial rendering of the animation of one portion of frames.

Thereafter, the virtual stereoscopic camera multi-rig is initialized in the computer software of the computer apparatus at block 303. Initialization may include activating a software object or initializing computer executable code segments which direct the computer apparatus to produce/render frames from the virtual stereoscopic camera multi-rig.

As mentioned above, a display means may be configured to display stereoscopic pairs of images/frames to confirm work settings. Upon initialization of the first, second, third and fourth virtual cameras, it may be desirable to re-confirm work settings using a display.

Thereafter, fine-tuning or adjustments to the camera pairs may be made at block 304. For example, settings for each virtual camera pair may be adjusted to create a desired 3D effect. The settings may include a focal length, depth of field, stereoscopic volume, desired inter-axial separation, zps, distance to object to be captured/recorded, distance to background area to be captured/recorded, as well as any other suitable settings including adjustment of inter-axial distance again alongside the multi-rig spacing.

As described above, a virtual stereoscopic camera multi-rig may include logical representations of at least four cameras. Hereinafter, virtual stereoscopic camera multi-rigs are described in detail with reference to FIG. 9.

Figure 9:
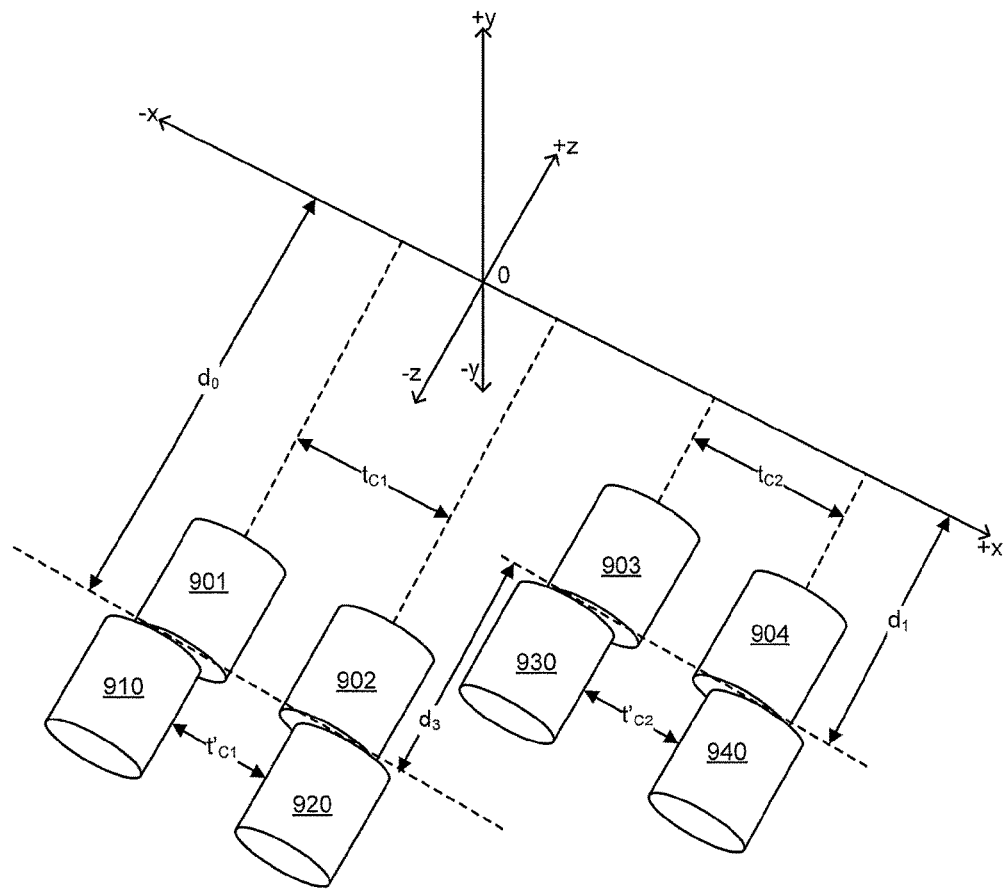
FIG. 9 depicts a virtual stereoscopic camera multi-rig for 3D animation, according to example embodiments.

Turning to FIG. 9, an enhanced virtual stereoscopic camera multi-rig is illustrated. The virtual stereoscopic camera multi-rig may comprise a first virtual lens 901 and a second virtual lens 902 separated by an inter-axial spacing of tC. The virtual stereoscopic camera multi-rig may further include a first virtual film plate 910 arranged proximate the first virtual lens 901. The first virtual film plate 910 is a logical representation of a real film plate or optical sensor for capturing video. The virtual stereoscopic camera multi-rig may further include a second virtual film plate 920 arranged proximate the second virtual lens 902. The second virtual film plate 920 may be substantially similar to the first virtual film plate 910, or may be configured to perform differently according to any desired setting or final 3D effect.

The virtual stereoscopic camera multi-rig may further comprise a third virtual lens 903 and a fourth virtual lens 904 separated by an inter-axial spacing of tC2. The virtual stereoscopic camera multi-rig may further include a third virtual film plate 930 arranged proximate the third virtual lens 903. The third virtual film plate 930 is a logical representation of a real film plate or optical sensor for capturing video. The virtual stereoscopic camera multi-rig may further include a fourth virtual film plate 940 arranged proximate the fourth virtual lens 904. The fourth virtual film plate 940 may be substantially similar to the first, second, and third virtual film plates 910, 920, and 930, or may be configured to perform differently according to any desired setting or final 3D effect.

A recording plane of each pair of the virtual film plates is perpendicular to both virtual lens axes depicted. Furthermore, both virtual lens axes of each camera pair are parallel. The recording planes of the pairs of virtual cameras are separated by a multi-rig distance d3. Although particularly illustrated in a particular orientation, it should be appreciated that the pairs of virtual cameras may be overlapping, angled, shifted, or otherwise set up differently than the example shown. More clearly, as the pairs of cameras are virtual, there is no physical limitation as to their placement for recording.

Furthermore, both pairs of virtual film plates are adjustable along the x-axis denoted by the measure t'C and t'C2. The adjustment may be performed through computer software such that horizontal displacement of each of the virtual film plates encourages horizontal image translation. Through the use of horizontal image translation at each pair of virtual cameras, any otherwise resulting keystoning effects and parallax may be reduced by establishing a zero parallax setting.

By shifting the projection images through the use of the adjustable spacing of the virtual film plates, an observer has the ability to control the relative "out-of-screen" or "into-screen" parallax of objects in the scene. Typically the overall parallax effect is determined by a combination of the pre-rendering viewpoint separation step and post-rendering image shift step. Furthermore, through adjustment of the multi-rig spacing, distortions due to depth of field differences between foreground and background of a 3D animation may be reduced.

Therefore, overall parallax and distortion control may be achieved through a combination of inter-axial distance manipulation, horizontal image shift adjustment, and multi-rig spacing for the entire multi-rig camera (multi-rig cameras introduce depth distortion for creative reasons). Increasing inter-axial distance widens the parallax between left and right views for greater overall depth effect. Movement or displacement of the camera pairs offers differing viewpoints for control of depth distortion effects. Further, compensating horizontal image shift values across both pairs of cameras determines where an overall zero-parallax setting is located in a scene, and therefore serves to balance the out-of-screen and into-screen depth effects entirely.

According to example embodiments, a user may adjust inter-axial distance, multi-rig spacing, and horizontal image shift throughout the image synthesis process. The user would also be allowed to fine-tune all three of these parallax parameters for optimal stereoscopic depth effects.

Using enhanced combinations of the horizontal shift adjustments described above, an enhanced 3D stereographic rendering may be produced by the virtual camera rigs adjusted at block 804 of method 800.

Thereafter, a minor sequence or short sequence of 3D animation may be rendered to re-confirm a desired 3D effect. For example, a short sequence including character motion, background motion, camera-panning, and/or other manipulation of portions of a virtual movie set and cameras may be produced. Thereafter, the short sequence may be viewed and/or confirmed.

Figure 10:
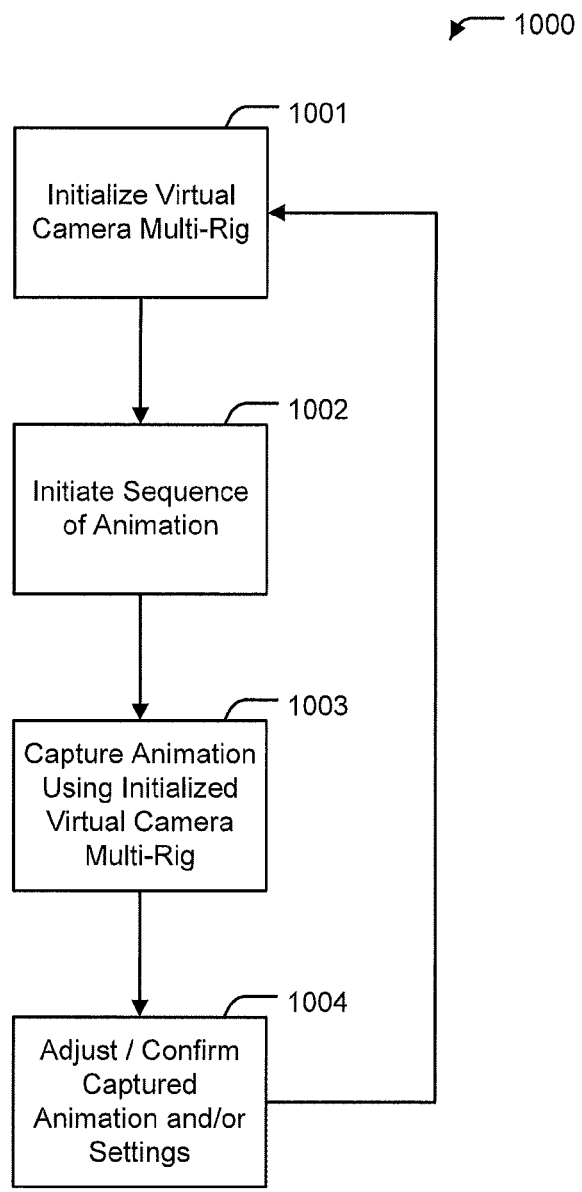
FIG. 10 depicts a method for 3D animation, according to example embodiments.

For example, as illustrated in FIG. 10, a method 1000 for producing 3D animation includes initializing a confirmed or previously adjusted virtual camera multi-rig at block 1001. Thereafter, a sequence of animation may be initiated at block 1002 and captured using the initialized virtual camera multi-rig at block 1003. The initiating and capturing may include rendering a plurality of computer animation frames based on a desired or predetermined frame rate, the animation frames comprised of a desired number of pixels or being of a desired resolution. The initiating and capturing may further include recording, through the virtual camera rig, the animation in a similar fashion as to real-life recording. Further, pre-processing, post-processing, editing, deleting, audio-integration, or any other suitable and/or necessary actions for producing a plurality of computer animation frames may be performed at block 1004.

Upon adjusting/confirming the captured animation, the method10 may repeat as necessary to re-adjust settings and re-capture a desired 3D animation using the plurality of newly available adjustments of the virtual camera multi-rig.

Thereafter, animation curves may be produced, and a final sequence or portion of a 3D animation may be produced. The animation curves may be set up through confirmation of a plurality of scene settings. The scene settings being logical representations of a physical set including elements rendered by the computer apparatus. For example, there may be a scene layout, scene background, characters, and animation of each, including any other suitable elements. Each of these settings may be checked/confirmed through short sequences as described above, or through real-time manipulation of the virtual stereo-camera pairs described above. For example, the computer software may be configured to allow a user to control the panning/motion of each stereo-camera pair in relation to the scene, while at substantially the same time allowing for adjustment of any desired settings. Upon confirmation, the final sequence or portion of the animation may be rendered, approved, and stored/edited.

This final sequence/animation may be stored in the stereo storage folder described above, or in another storage portion such that final approval, interim approval, or disapproval may be decided. If approved, the sequence may be stored for later editing and/or inclusion in a complete 3D animation. If interim/temporary approval is decided, the sequence may be stored and/or edited while other portions/sequences of a complete 3D animation are produced. If not approved, the entire sequence may be reproduced using different settings.

Although termed "final" sequence or animation, it should be understood that the sequence may be further adjusted or edited using computer software/modeling to achieve a desired 3D effect.

Figure 11:
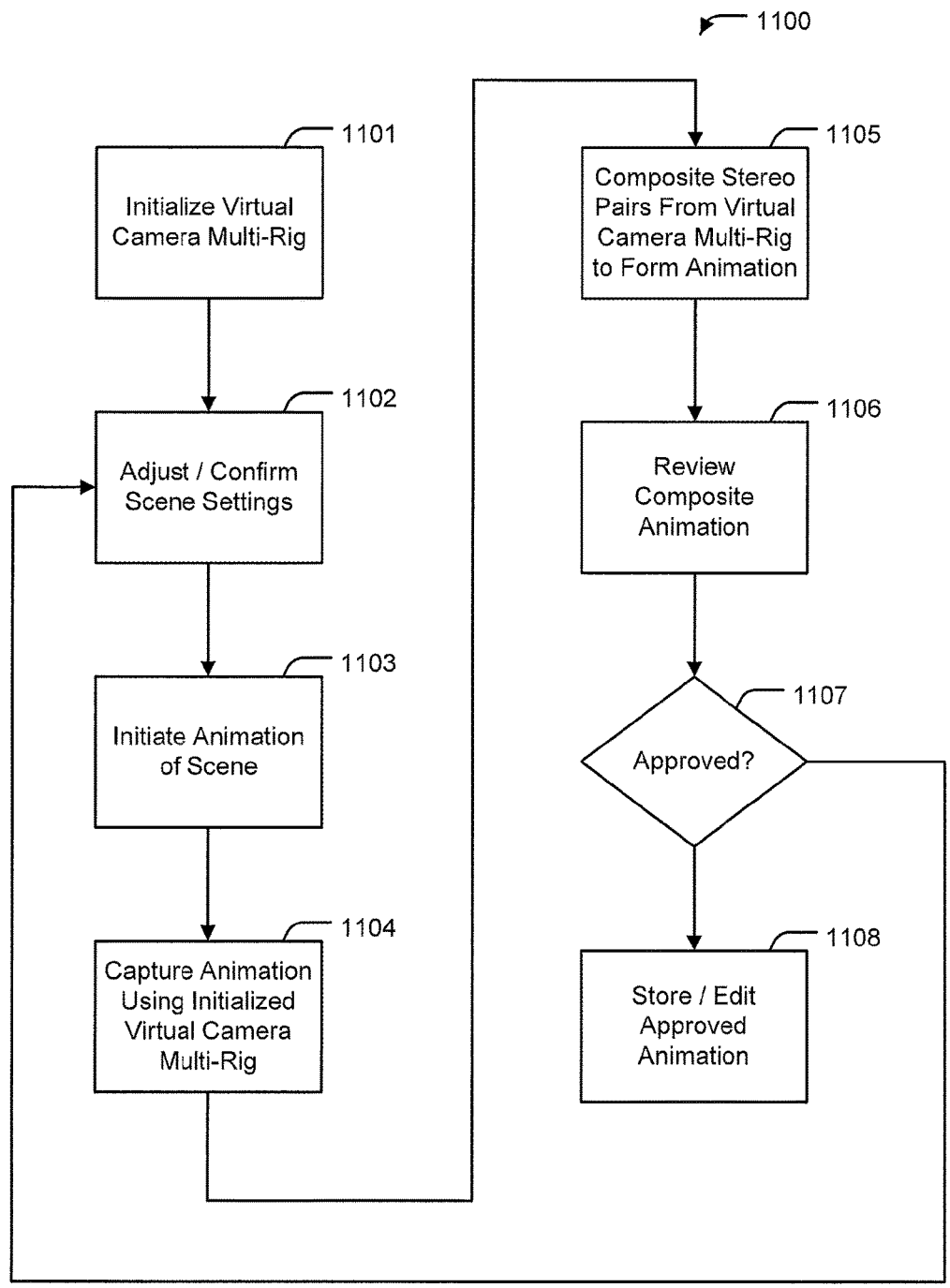
FIG. 11 depicts a method for 3D animation, according to example embodiments.

For example, FIG. 11 depicts a method for 3D animation including initializing a virtual camera multi-rig at block 1101. Thereafter, scene settings for a desired scene of a 3D animation may be adjusted/confirmed at block 1102. Animation may be initiated at block 1103 and captured using the initialized virtual camera multi-rig at block 1104. Upon capturing, related stereo pairs of frames may be composited together to form single stereo pairs with reduced depth distortions due to varying depths of foreground and background characters, scenery, etc at block 1105.

The composited animation may be reviewed at block 1106 and submitted to an approval process at block 1107. The approval process may include viewing of the composited 3D animation by a director or stereographic director of the 3D animation and approval, interim-approval, or final approval given as described above. The approved 3D animation may then be stored for further editing or distribution at block 1108. Furthermore, using information garnered through the approval process, additional settings may be adjusted and the method 1100 may repeat at block 1101 or 1102.

It should be appreciated that as a plurality of settings across multiple cameras may be adjusted, new artifacts and distortions may be introduced. However, example embodiments provide a method for 3D animation which significantly reduces these new artifacts.

Figure 12:
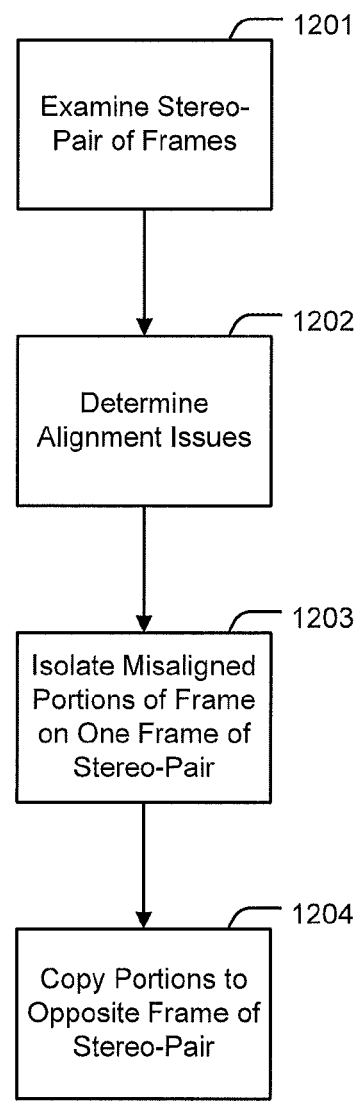
FIG. 12 depicts a system for 3D animation, according to example embodiments.

For example, although parallax and keystoning effects may be reduced, misaligned textures on 3D objects or other effects may become apparent through use of a virtual camera multi-rig. According to the method 1200 of FIG. 12, these misalignments may be corrected.

For example, the method 1200 includes examining a pair of stereo frames at block 1201. The method 1200 further includes determining alignment issues between the frames at block 1202. The determining may include locating misaligned textural features of objects in the examined frames.

Thereafter, the method 1200 includes isolating the misaligned portions on one frame of the pair of frames, for example, on the left or right frame. The isolated portions of the one frame are copied onto the opposite frame at block 1204. In this manner, the misaligned portions of texture are realigned resulting in a clear 3D effect Additional exemplary systems, methods and tools useful in adjustment of the 3D animation, pre- or post-rendering, are additionally described below:

Creating Stereoscopic Effect by Locking Maximum Background Binocular Parallax

Creation of the stereoscopic effect may be directed towards enhancement of a story and the creation of an immersive, but comfortable viewing experience for an audience. A key factor for comfort is a consistent stereo depth throughout a media piece (e.g., a movie (such non-limiting example will be used below)).

One exemplary technique involves pre-selecting the overall size (or deepness) of the stereo volume of a movie so that the overall stereo depth is consistent throughout. This may be done by choosing a constant maximum background parallax value for the movie. By removing this as a variable, screen placement (zps) may be prioritized as a main tool that the stereo artist utilizes in creating the stereo effect.

Depending on the story point or mood, the stereo artist can pull elements out of the screen closer to the audience or deeper into the shot away from the viewer. For example, placement of the stereo screen can create intimacy with the onscreen character, or a sense of uneasiness in a precarious environment. When screen placement is decided, the inter-axial distance between the stereo cameras may be calculated so that the stereo volume results in a maximum background parallax that matches the chosen maximum background parallax constant.

Figure 13:
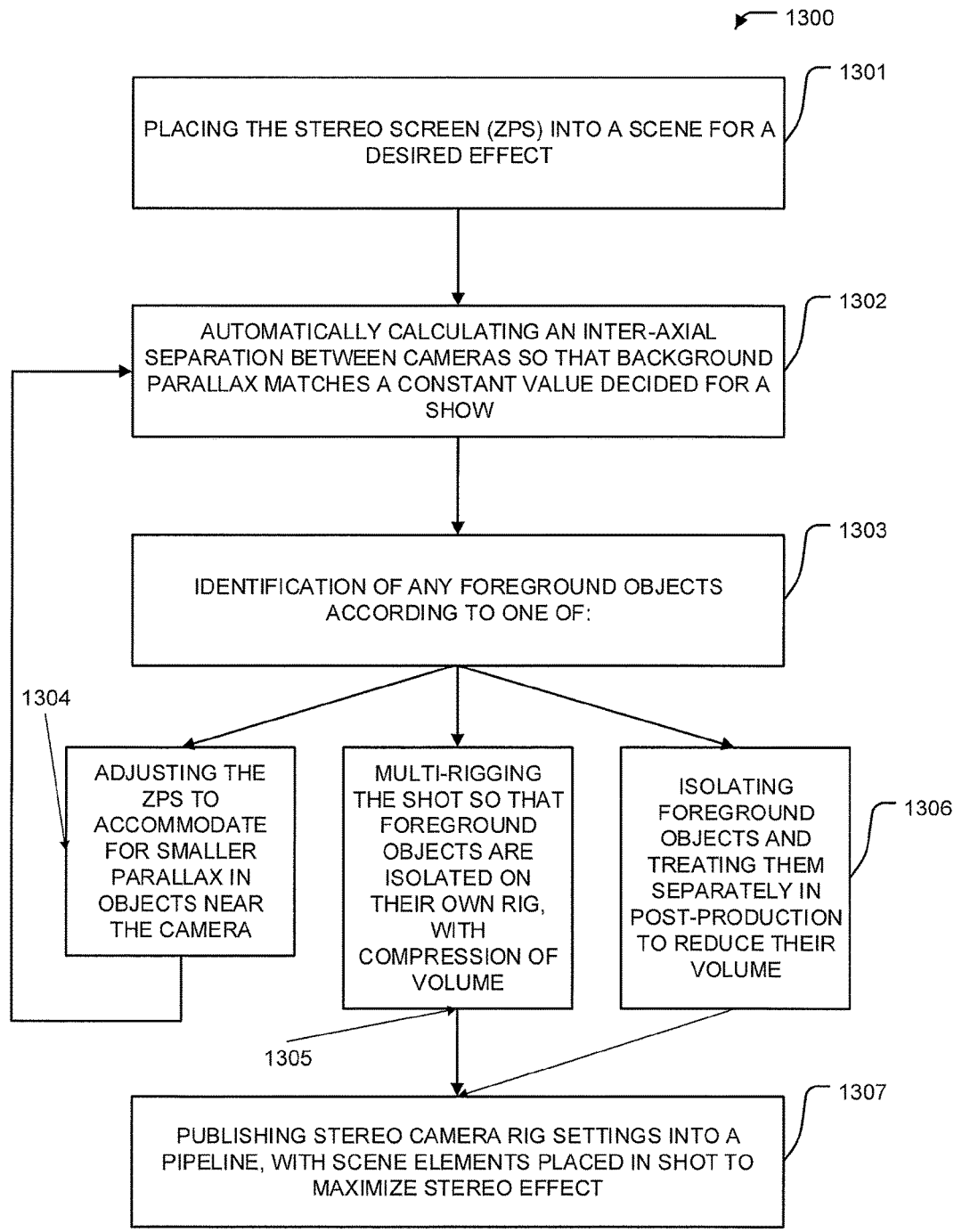
FIG. 13 depicts a method for creating stereoscopic effect by locking maximum background binocular parallax, according to example embodiments.

Reference is made to FIG. 13, which illustrates an exemplary flowchart generally at 1300. Exemplary steps in this exemplary embodiment include one or more of:

1) Placing the stereo screen (zps) into the scene for the desired effect (e.g., guided by mood of a shot or story point (block 1301 in FIG. 13);

2) Automatically calculating an inter-axial separation between cameras so that the background parallax matches the constant value decided for a show (block 1302);

3) Identification of any foreground objects near the camera with too much parallax separation (block 1303), followed by one of:

(a) Adjusting the zps to accommodate for smaller parallax in object(s) near the camera (block 1304), followed by a return to step (2) at block 1302;

(b) Multi-rigging the shot so that the foreground object(s) are isolated on their own stereo rig, with compression of their volume (block 1305); and (c) Isolating the foreground object(s) and treating them separately in post-production to reduce their volume (block 1306); and 4) Publishing stereo camera rig settings into a pipeline so that they are available for others to visualize their scene files in stereo, with scene elements placed in shot to maximize the stereo effect (block 1307).

Implications of locking maximum background binocular parallax beneficially include the fact that shots are consistently deep. The below described system, method and tool, "Determining Maximum Parallax" allows the stereo artist to place far background elements, e.g., skies and mountains, in depth correctly and consistently (whereas prior processes result in such objects (e.g., skies) unintentionally placed at noticeably different levels of depth from shot to shot, requiring post-rendering correction). In post-production, other elements can also be tracked in depth relative to distant objects such as the sky regardless of stereo camera animation, since the stereo parallax of the distant object(s) is a known, fixed value.

Further implications will be discussed after a description of "Determining Maximum Parallax."

Determining Maximum Parallax

Figure 14:
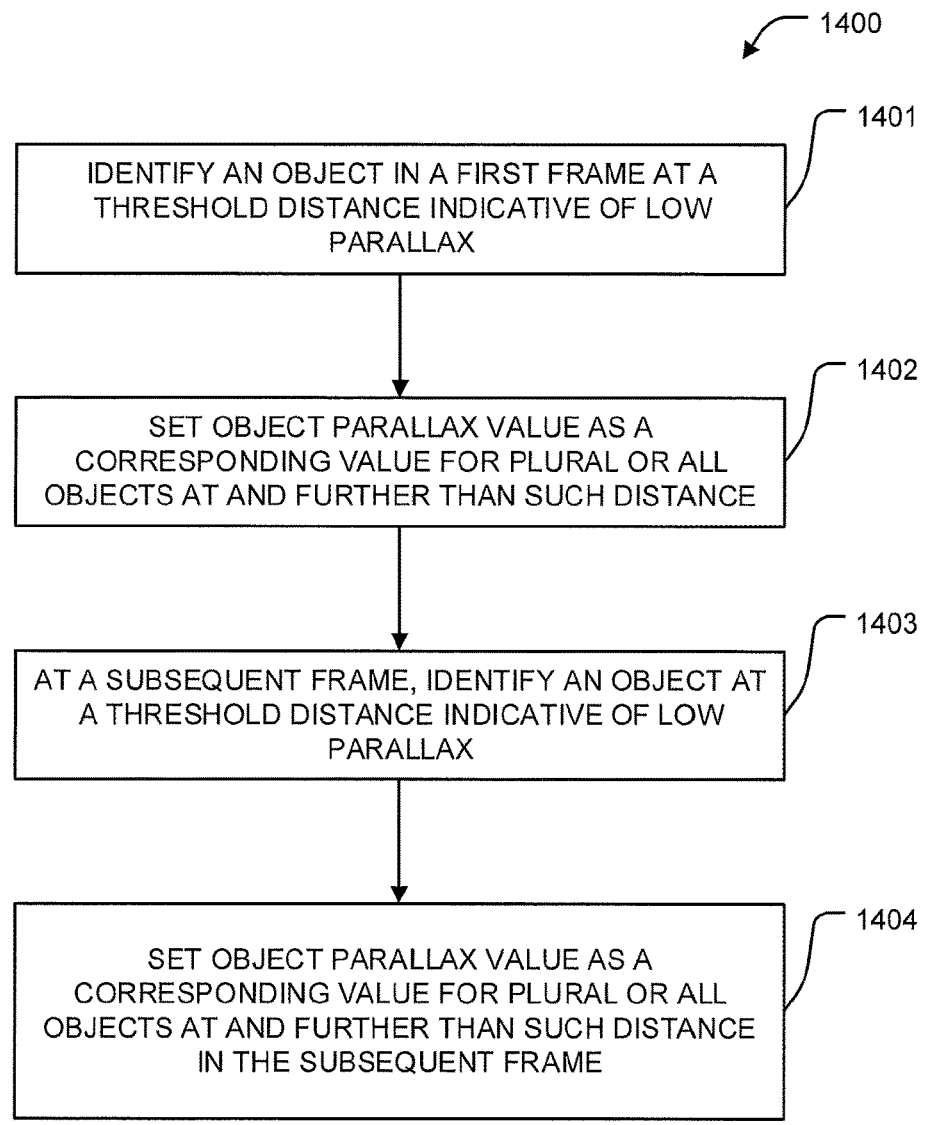
FIG. 14 depicts a method for determining maximum parallax, according to example embodiments.

Additional exemplary embodiments provide a system, method and tool that determines the maximum amount of parallax as a translation of previously chosen maximum parallax for any object in a scene, given a certain set of stereo values. Reference is made to FIG. 14, which describes determination of maximum parallax generally at 1400. Generally, the object considered to be the furthest in the background is the sky; and the depth of the sky can be thought of as "approaching infinity" in terms of how far away it is.

As an example, a view into a grassy field, with mountains, sky and clouds in the far background provides a scene with close and far objects. As the viewer's perspective shifts considerably, e.g., to the left, close objects move considerably to the right within the viewing area. Objects at medium distance move slightly less to the right; and mountains, sky, etc. that are far away will seem not to move at all. This concept of how apparent positions of objects change as point of view is shifted is parallax; and it is apparent that close objects have large parallax change, while distant objects have low parallax change. This parallax can be calculated using a geometric formula, based on lateral displacement, field of vision and distance to a given object.

Stereoscopic imagery appears as 3D because of the amount of parallax changes as perspective moves further back into the scene. However, noticeable change lessens as it moves further back. With regard to the grassy field example, as perspective shifts, grass blades nearer to the perspective, as well as those at a medium distance will move by noticeably different amounts, whereas distant objects appear not to move at all, even though they are very far apart. Thus, when objects are far enough away, parallax need not be calculated for every object. Rather, it is enough to find at least one exemplary value for use with plural (or all) objects that are sufficiently far away.

Therefore, in exemplary embodiments, a system, method and tool are provided configured to calculate what that amount of parallax is for a give set of stereo variables. That is, such system, method and tool identify an object in a first frame at a threshold distance indicative of low parallax (block 1401 in FIG. 14) and calculate a certain parallax value for at least one object at or around a threshold distance for use for plural or all objects at and further than that distance (block 1402). In exemplary embodiments, this value may be considered to be the parallax value at infinity, e.g., used for skies, far away clouds, etc. In other exemplary embodiments, the value can be adjusted by the user to create additional 3D effects.

The value(s) may also be calculated on a per-frame basis (see block 1403, which performs such calculations in a second, subsequent frame, and block 1404, which sets the calculated value for other objects at or further than the identified object), for example for when the stereo variables are changed over time. This prevents distant objects, e.g., the sky, from appearing to shift around and also prevents "depth discrepancy" errors, in which closer objects appear to go "behind" the sky when viewed in stereo.

Other exemplary implications of locking maximum background binocular parallax beneficially include the presently described system method and tool for stereo effect visualization that does not require a 3D monitor (described below under the heading "Representation Stereo Effect on Non-Stereoscopic Monitor," comprising planes perpendicular to the camera frustum placed at key distances from a stereo rig. In exemplary embodiments, these key distances are a function of the details of the stereo camera rig (e.g., inter-axial distance, focal length, stereo screen/zps placement, etc.). This provides a system, method and tool that better informs other stereo artists and users as to how to place elements in a scene to take advantage of the stereo effect in a shot. Such also allows users to be informed if objects are placed too close to a camera, potentially causing discomfort to a viewer.

This system, method and tool also allows for greater flexibility in a stereo pipeline and scene layout. Because it does not need to accommodate for every asset in a scene, stereo cameras may be set up earlier in a pipeline, before all assets may be available. Stereo can be set up in phases early on, starting with broad gestural stereo depth, and then refined to the character level as the shot advances through a pipeline. The system, method and tool facilitates notification of downstream users of the intent of the shot so that each element will fit within the comfort zone of the stereo experience and can take advantage of the stereo effect.

Representation of Stereo Effect on a Non-Stereoscopic Monitor

Figure 15:
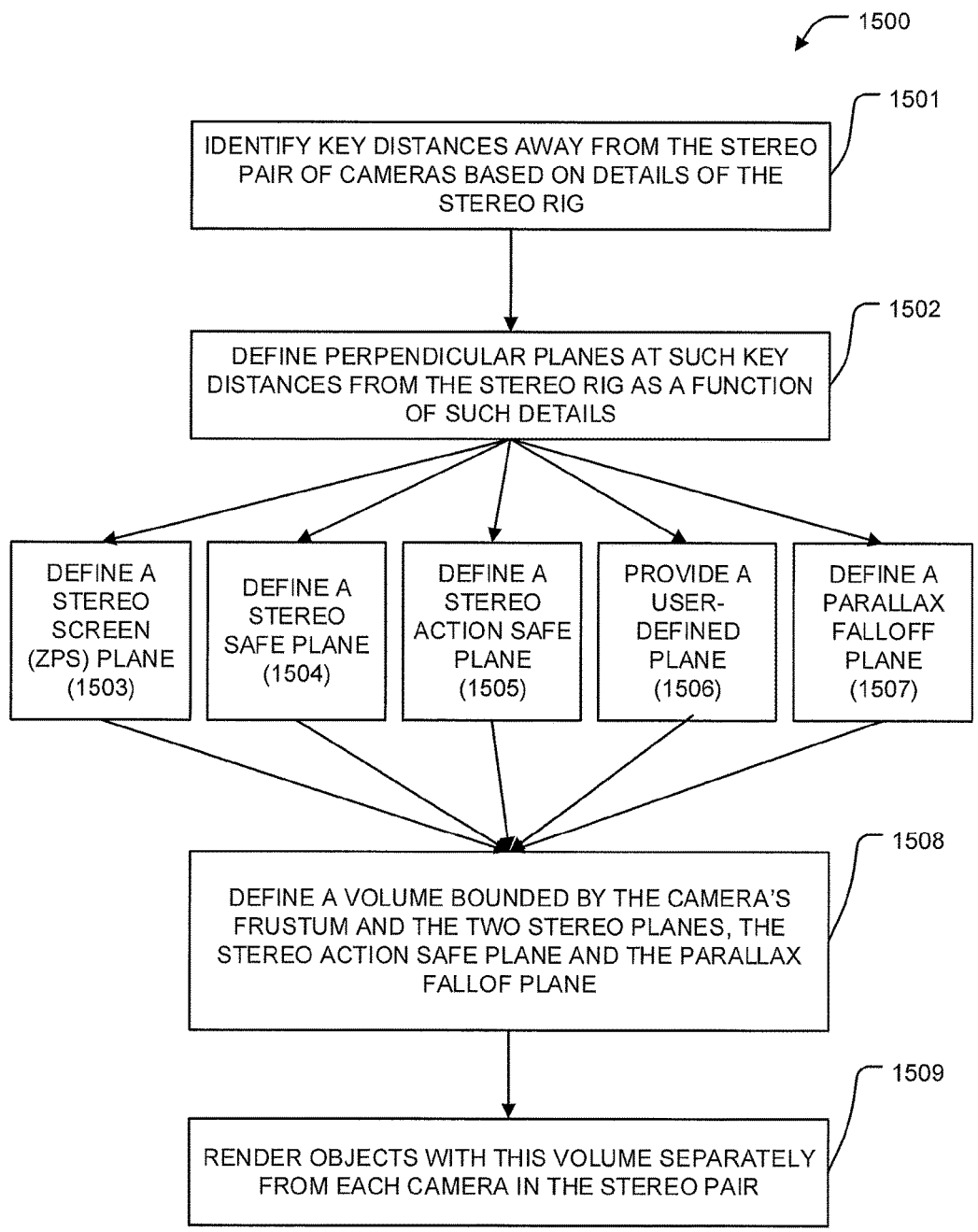
FIG. 15 depicts a method for representation of stereo effect on a non-stereoscopic monitor, according to example embodiments.
Figure 16:
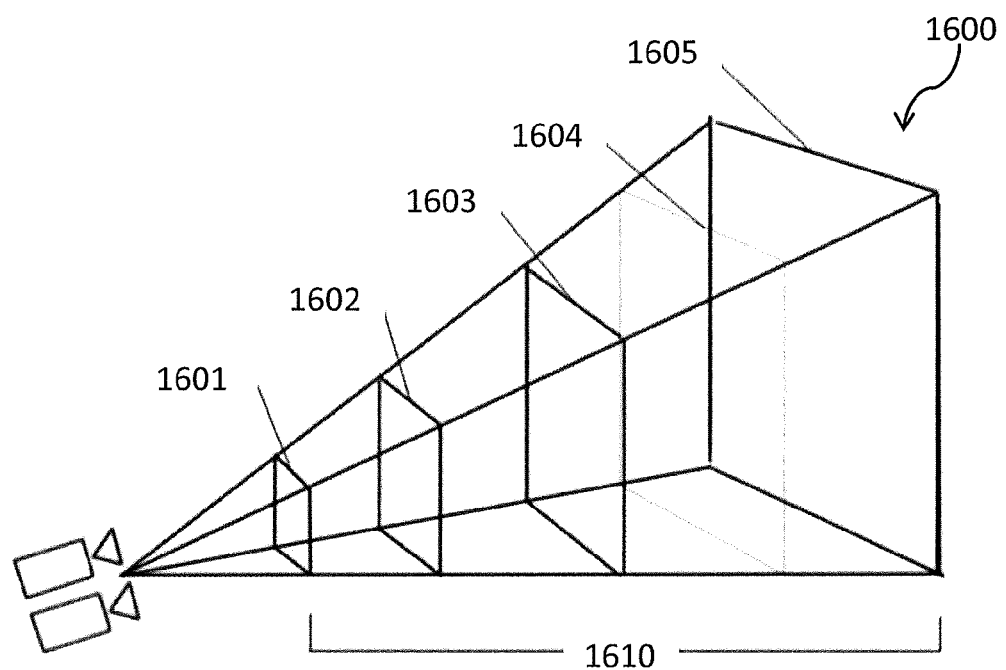
FIG. 16 depicts a perspective view of a diagram illustrating the representation of FIG. 15, according to example embodiments.

Reference is made to FIG. 15, which shows a method of representing a stereo effect on a non-stereoscopic monitor generally at 1500, as well as FIG. 16, which is a perspective view, shown generally at 1600, of such a representation from FIG. 15.

Not every department in the animation pipeline has access to a viewing device capable of stereoscopic display. In order to communicate across the pipeline the intended stereo effect for each shot, an exemplary system, method and tool allows representation of the stereo effect within each shot setup that works on an ordinary non-stereoscopic monitor.

Knowing the details of a stereo rig (interaxial distance, focal length, stereo screen/zps placement, etc), in exemplary embodiments, key distances away from the stereo pair of cameras are determined (block 1501, FIG. 15) that can inform other stereo artists and users in a pipeline how to better place elements in a scene to take advantage of the stereo effect in a shot. A preliminary setup of stereo rigs early in the pipeline may be utilized to create overall gestural passes of the stereo effects for each shot.

The exemplary system, method and tool provides a visualization consisting of planes perpendicular to the camera intersecting the camera frustum(s) (block 1502). The planes are placed at key distances from the stereo rig as a function of the details of the stereoscopic rig (for example, interaxial distance, focal length, stereo screen/zps placement, etc) Exemplary visualization planes described below are, e.g., based on 20 motion graphics conventions of title and action safe areas on the screen.

Referring now to FIG. 16, item 1601, and FIG. 15, block 1503, an exemplary "stereo screen," or "zero-parallax-screen" (zps) divides up the shot into elements behind the physical projection screen and elements in front of the screen in audience space. The stereo artist may decide this screen placement and bisect the scene into these two areas based on the mood or story point. There is no stereoscopic parallax at this distance away from camera.

Referring now to FIG. 16, item 1602, and FIG. 15, block 1504, an exemplary "stereo safe plane" comprises the closest distance one would want to place an object in the scene away from the camera. Any closer and it may be uncomfortable for the viewer. In exemplary embodiments, the maximum amount of image separation allowed at this proximity to the stereo camera pair can be arbitrarily set in the tool, but may also be defaulted to a pre-determined amount known to be comfortable to view for periods of time. A maximum amount of image separation can be measured in pixels, percentage of width of the image, or other calibrated system of measure.

Referring now to FIG. 16, item 1603, and FIG. 15, block 1505, an exemplary "stereo action safe plane" provides for cases of particulate objects (e.g., snow, rain, effects, debris) that enter and exit the shot frame quickly. In exemplary embodiments, these elements can be allowed closer to the camera up to this stereo action safe plane to better immerse the viewer into the shot. A commonality of these elements is that they do not linger on screen for any significant duration of time that would cause the viewer discomfort. In exemplary embodiments, an amount of maximum image divergence allowable at this closer proximity to the stereo camera pairs is greater than the maximum divergence at the stereo safe plane. This divergence value is also established through experience and the tool defaults to this to establish this Stereo action safe distance away from camera. The maximum amount of image separation can be measured in pixels, or percentage of width of the image, or other calibrated system of measure.

Referring now to FIG. 16, item 1604, and FIG. 15, block 1506, an exemplary "user-defined plane" allows a user to input a distance from the stereo camera rig into the tool to calculate how much divergence to expect between the right and left eye images at this distance for the stereo effect for this stereo camera pair. This allows the user to sample the amount of binocular parallax throughout the scene. The parallax reported can be measured in pixels, percentage of width of the image, or other calibrated system of measure.

Referring now to FIG. 16, item 1605, and FIG. 15, block 1507, an exemplary "parallax falloff plane" describes a distance from the stereo camera rig that represents the furthest an object can be placed away from camera and still achieve a predetermined (e.g., by the stereo artist) minimum amount of stereo volume. This informs the artists in an animation pipeline how to best place elements in the set in front of this plane to maximize the amount of stereo effect of these objects. Elements placed beyond this distance will be perceived as flat in stereo depth and may suggest the use of a matte-painting background or card-based imagery instead of geometry.

Referring now to FIG. 16, item 1610, and FIG. 15, block 1508, the volume indicated by item 1610 is bounded by the camera's frustum and the two stereo planes: stereo action safe and the parallax falloff plane. This bounding volume suggests that the stereo effect of objects located within would be best served if rendered separately (block 1509, FIG. 15) from each camera in the stereo camera pair. Furthermore this also indicates that objects that exist in space beyond this volume away from the cameras have barely perceptible stereoscopic volume. For these objects, rendered images produced from one of the cameras can be reused by horizontally shifting a certain amount in place of rendered images from the other camera and saving on render resources.

Digital Contact Sheet Created for Viewing Frames in Stereo

Figure 17:
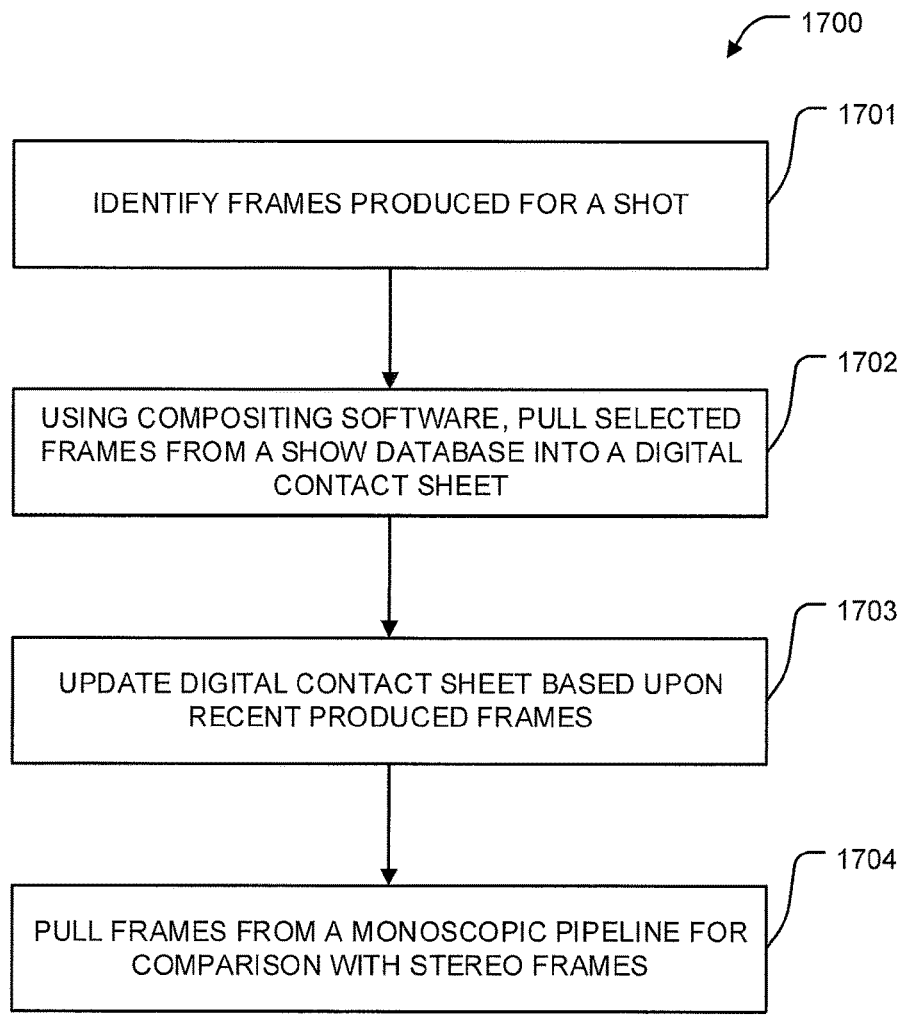
FIG. 17 depicts a method for producing a digital contact sheet created for viewing frames in stereo, according to example embodiments.

Another exemplary system, method and tool provides for a digital contact sheet created for viewing frames in stereo. FIG. 17 illustrates creation of such digital contact sheet generally at 1700.

As part of the stereoscopic movie making process, an important consideration is the viewer's comfort and experience during the movie. There is a need to ensure that the stereo effect is consistent across shots, sequences and the show. It is time consuming and resource intensive to pull together all of the frames for an entire sequence(s) of the movie and view it each and every time the stereo artist wants to review their work as a whole.

The present exemplary system, method and tool provide a digital contact sheet created for viewing frames in stereo. It is implemented in (e.g., Nuke) compositing software. With reference to FIG. 17, at block 1701, frames are identified after or as they are being produced for a shot and imported (or pulled in) from a show database by such compositing software (block 1702).

This advantageously provides a virtual sheet of stereoscopic thumbnails that represent a sampling of shots across an entire sequence. A user can look across the sheet of thumbnails to evaluate the deepness of a shot or determine if an object sticks too far out into audience space relative to the surrounding shots.

In exemplary embodiments, the contact sheet has enough resolution to allow zooming into the thumbnail of the shot so that it fills the viewing screen. This allows further investigation into the shot for depth issues, conflicts, etc. without having to navigate to the actual shot on the network, load the frames into memory, and then inspecting for issues.

In exemplary embodiments, the stereo contact sheet pulls in the most recent frames that have been produced for each shot (see FIG. 17, block 1703), whether it is in one of many camera setup phases, preliminary renders, or final finished frames. For each shot, the frames are may be automatically selected by a stereo contact sheet tool by referencing the show database for specific frames that a user, e.g., a lighting department) has marked for master (e.g., lighting) work.

Additionally, in exemplary embodiments, first and last frames of each shot may also be included by default as these frames immediately interface to the previous and next shots in the same sequence. This may be important in evaluating how the stereo effect flows from one shot to the next. In exemplary embodiments, the stereo contact sheet can also pull in frames from a monoscopic pipeline so that comparisons can be done to ensure the stereo frames have not deviated too far from the mono version (see FIG. 17, block 1704).

Parallax Shift

A present exemplary system, method and tool generates a left eye image with stereo variables, e.g., as a post render tool, matching any left eye image rendered by software, e.g., Studio++. P (parallax)-shift first generates a left eye image using the stereodata (left eye camera information) from the software to displace pixels using the right eye image to their corresponding left eye location. This tool allows generation of a left eye image without any re-rendering, providing a properly fuseable stereo pair. This tool also serves as a pre-cursor to the following Hole-Filling techniques.

Parallax Maps: Hole-Filling

A present exemplary system, method and tool corrects for holes created by missing pixel information, e.g., as a post render tool used for pixel remapping, from a left camera perspective, a method of which is illustrated generally at 1800 in FIG. 8. Such method identifies holes created by missing pixel information from a left camera perspective at block 1801 and implements one or more hole filling techniques at block 1802.

Figure 18:
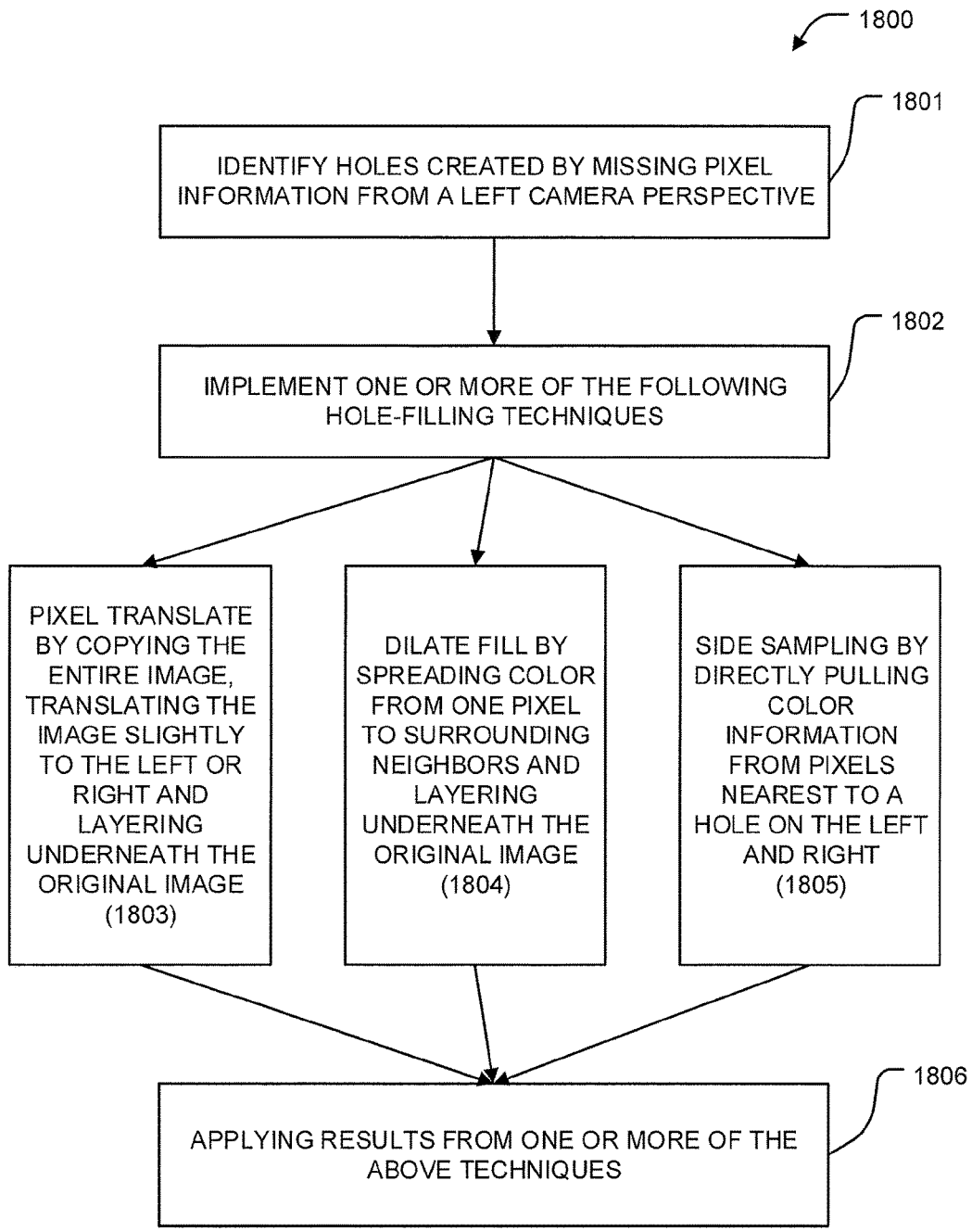
FIG. 18 depicts a method for correcting for holes created by missing pixel information from a left camera perspective, according to example embodiments.
Figure 19:
FIG. 19 depicts a normally rendered right eye image, according to example embodiments.
Figure 20:
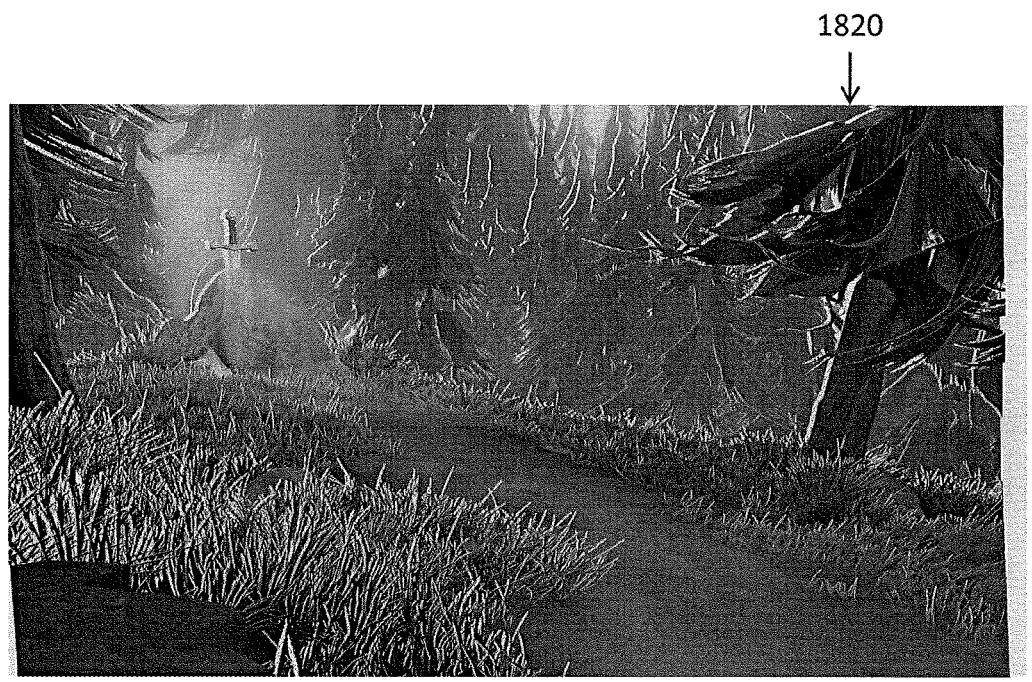
FIG. 20 depicts a shifted left eye image with unfilled holes, according to example embodiments.

The below describes three exemplary hole-filling techniques. In exemplary embodiments of the present system, method and tool, one or more of the below may be used on the same image (e.g., within different parts of the frame in order to get the most appealing image possible) (see FIG. 18, block 1806). Various FIGURES are described below for a comparison of techniques. In such comparative images, the left camera parallax is exaggerated so that hole-filling differences can be highlighted, as compared with FIG. 19, which is a right eye image that is rendered normally, shown generally at 1810 and FIG. 20, which shows generally at 1820 shifted left eye image with holes unfilled:

Pixel Translation

Figure 21:
FIG. 21 depicts a shifted left eye image with pixel translation, according to example embodiments.

With an exemplary pixel translation technique (block 1803, FIG. 18), an entire image is copied, translated slightly to the left or right, and then layered underneath the original image. Reference is made to FIG. 21, which shows generally at 1830 a shifted left eye image with pixel translation. This translation may be controllable by the user and can be adjusted to create an optimum result. This technique provides for fast hole-filling, though in extreme cases may not be enough to cover the entire problem areas.

Dilate Fill

Figure 22:
FIG. 22 depicts a shifted left eye image with dilate fill, according to example embodiments.

An exemplary dilate fill technique (block 1804, FIG. 18) uses pixel dilation, an image function that causes pixels to 'bloat' outward, spreading color from one pixel to all of its surrounding neighbors. Reference is made to FIG. 22, which shows a shifted left eye image with dilate fill generally at 1840. This dilated version of the image may then be layered underneath the original image to fill in the holes. The number of neighboring pixels affected in the dilated image may be controlled by the user. This technique is slower than pixel translation, but can produce cleaner results.

Side Sampling

Figure 23:
FIG. 23 depicts a shifted left eye image with side sampling, according to example embodiments.

An exemplary side sampling technique (block 1805, FIG. 18) provides a slower, but more complete result, particularly with regard to smaller holes. Reference is made to FIG. 23, which shows a shifted left eye image with side sampling generally at 1850. Instead of creating a new image and layering it underneath, as the other two above exemplary techniques do, side sampling looks at the holes and directly pulls color information from the pixels nearest to it on the left and right. Essentially, it smears pixel color into the holes from the sides, akin to pushing two blobs of paint closer together to fill a space between them. This can produce very appealing results for smaller holes.

Real-Time Compositing of Multiple Stereo Camera Views

Another exemplary system, method and tool provides for real-time compositing of multiple stereo camera views. Such is illustrated generally at 2400 in FIG. 24.

To allow art direction of the stereo effect, it may be necessary to multi-rig a shot so there are multiple stereo rigs (multiple pairs of cameras) that are used to view different parts of the set. Set geometry is isolated and assigned to groupings as a function of depth. There is one grouping per stereo camera rig (see block 2401, FIG. 24).

In exemplary embodiments, when the stereo camera rigs are being setup, the stereo rigs can be adjusted to add or remove additional depth from parts of the shot. This can all be done in real-time with immediate and directly viewable results in stereo (block 2403, FIG. 24).

Figure 24:
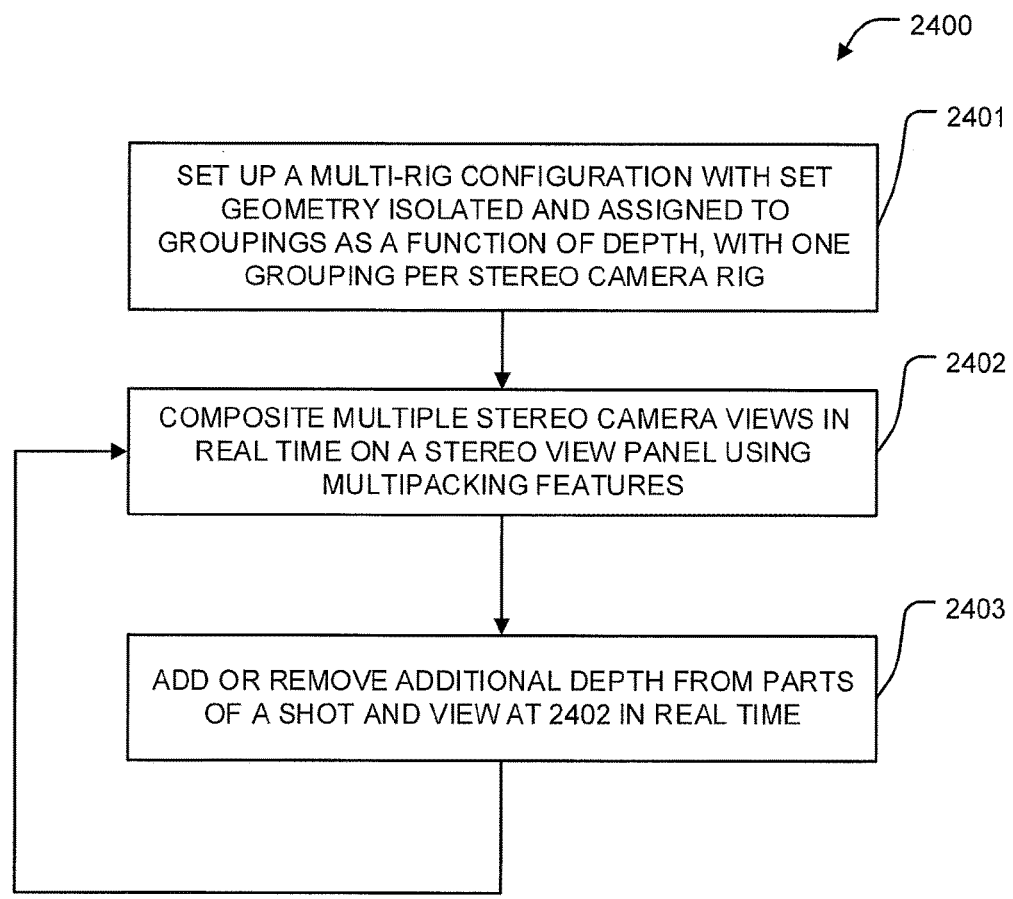
FIG. 24 depicts a method for real-time compositing of multiple stereo camera views, according to example embodiments.

The present system, method and tool implements a stereo view panel using (e.g., Maya's) multipacking features that allows real-time compositing of multiple stereo camera views (block 2402, FIG. 24). In prior processes, rendering out had to be done for separate pairs of left and right eye frames for each stereo rig. The different pairs of images would then get composited in an external application to produce a single set of viewable stereo frames and then back to camera setup if adjustments are needed. The present exemplary system, method and tool eliminates the tedious workflow of prior processes.

Emulation of a Multi-cam Rig

Figure 25:
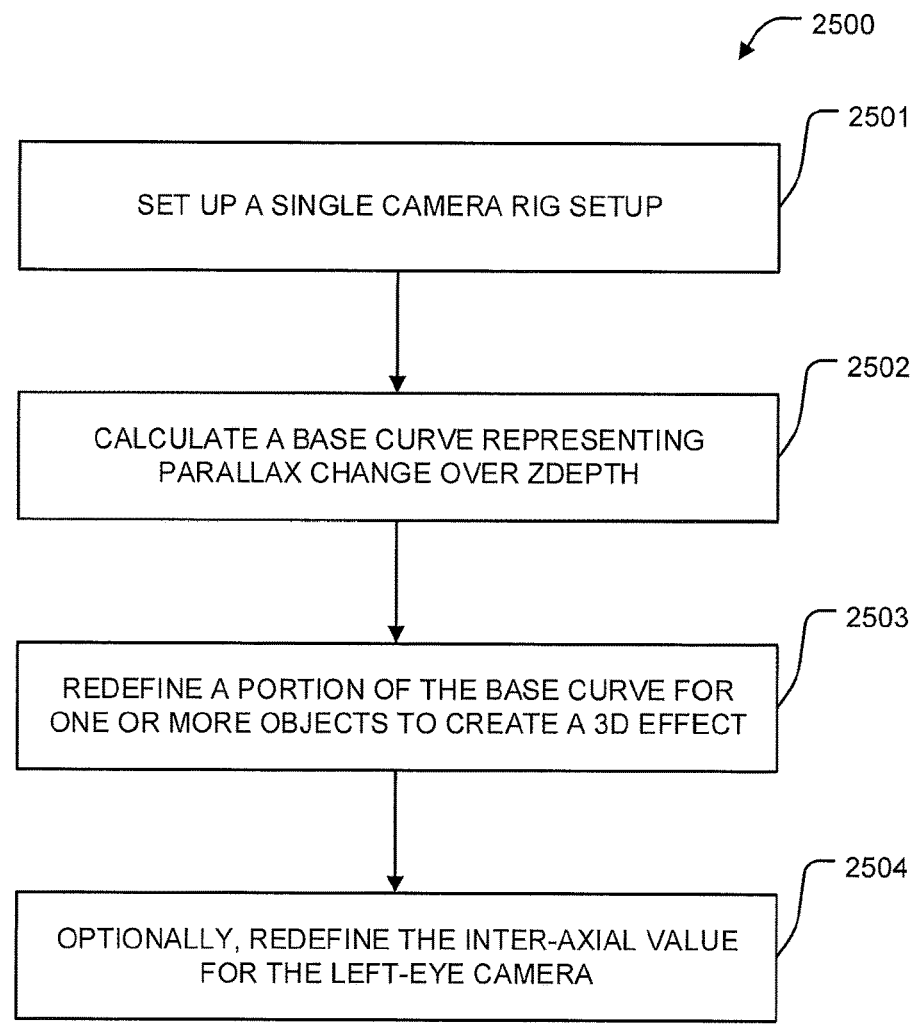
FIG. 25 depicts a method for emulation of a multi-cam rig, according to example embodiments.

FIG. 25 illustrates at 2500 an exemplary method of emulating a multi-cam rig. A single camera rig setup (block 2501) may be adjusted to emulate a setup utilizing many rigs that could otherwise divide up a scene into many little volumes along the z-axis of the camera, with separation of geometry contained within each of these plural volumes, allowing discrete adjustment across a scene. Such a system allows for compression and expansion of surfaces, such as ground planes, light volumes, continuous surfaces, etc., that otherwise could not be adjusted discretely. In exemplary embodiments, such a setup allows adjustment of parallax at any selected z-depth, but without having to divide up the scene into different camera rigs.

In exemplary embodiments, such a system comprises calculating a base curve for an initial stereo setup using parallax math, the base curve representing parallax change over zdepth (block 2502). An exemplary equation for such calculation is:

$$y = a/z + b,$$

where y is parallax, z is geometry depth, a is a value calculated using interaxial and focal length, and b is a value calculated using zps depth. In exemplary embodiments, this curve may be redefined as desired to create a 3D effect (block 2503).

In a first example, where an fg character is positioned 20 units away from a camera standing on a visible ground plane, a calculated base curve could be flattened from the interval of 0-20 units from the camera to reduce the amount of parallax change, with the curve unmolested between 20+ units to infinity. Such an example would result in the fg character being perceived with reduced stereo volume, while the rest of the set looks normal. Additionally, in exemplary embodiments a left-eye camera could be set with an interaxial of 0.0 (sitting on top of the right-eye camera), with parallax being solely dictated by a custom parallax curve (block 2504).

Figure 26:
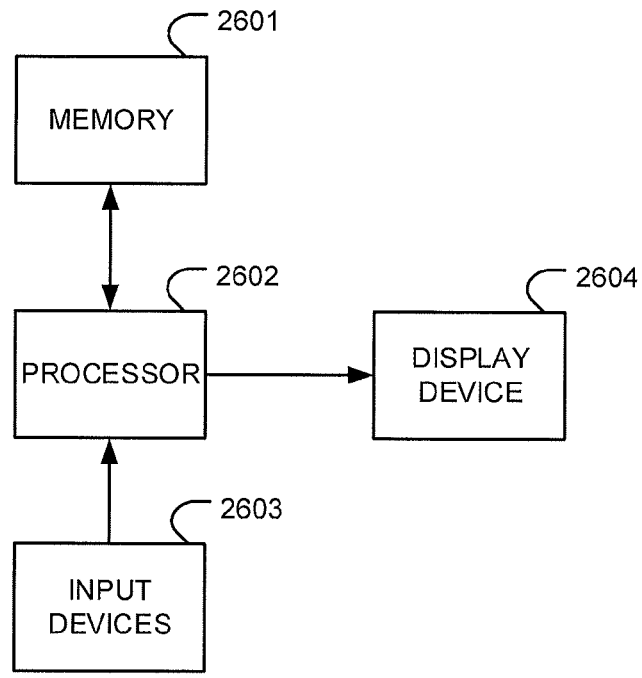
FIG. 26 depicts a computer apparatus, according to example embodiments.

Furthermore, according to an example embodiment, the methodologies described hereinbefore may be implemented by a computer system or apparatus. For example, FIG. 26 illustrates a computer apparatus, according to an exemplary embodiment. Therefore, portions or the entirety of the methodologies described herein may be executed as instructions in a processor 2602 of the computer system 2600. The computer system 2600 includes memory 2601 for storage of instructions and information, input device(s) 2603 for computer communication, and display device(s) 2604. Thus, the present invention may be implemented, in software, for example, as any suitable computer program on a computer system somewhat similar to computer system 2600. For example, a program in accordance with the present invention may be a computer program product causing a computer to execute the example methods described herein.

Figure 27:
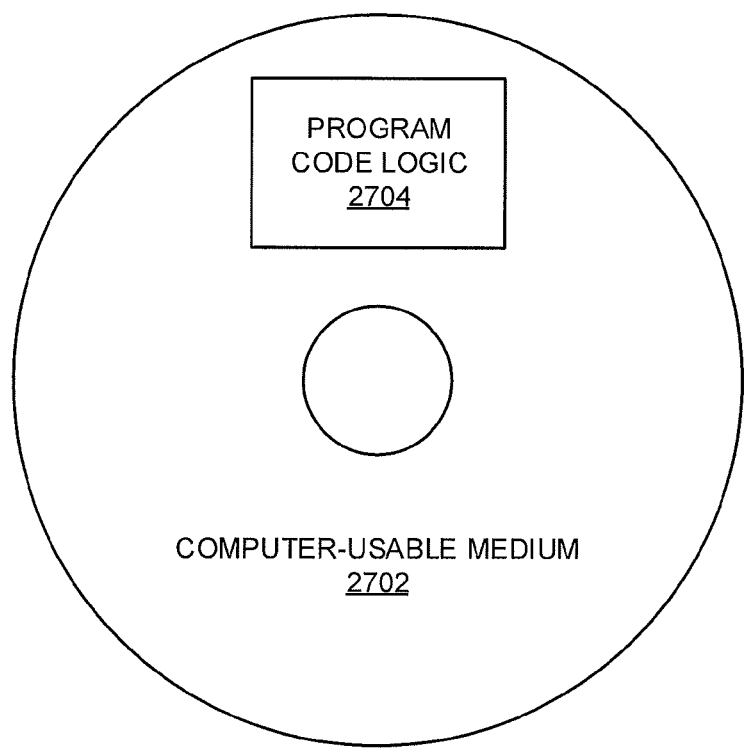
FIG. 27 depicts a computer program product, according to example embodiments.

Thus, example embodiments may include a computer program product 2700 as depicted in FIG. 27 on a computer usable medium 2702 with computer program code logic 2704 containing instructions embodied in tangible media as an article of manufacture. Exemplary articles of manufacture for computer usable medium 2702 may include floppy diskettes, CD-ROMs, hard drives, universal serial bus (USB) flash drives, or any other computer-readable storage medium, wherein, when the computer program code logic 2704 is loaded into and executed by a computer, the computer becomes an apparatus for practicing the invention. Embodiments include computer program code logic 2704, for example, whether stored in a storage medium, loaded into and/or executed by a computer, or transmitted over some transmission medium, such as over electrical wiring or cabling, through fiber optics, or via electromagnetic radiation, wherein, when the computer program code logic 2704 is loaded into and executed by a computer, the computer becomes an apparatus for practicing the invention. When implemented on a general-purpose microprocessor (e.g., 2602), the computer program code logic 2704 segments configure the microprocessor to create specific logic circuits.

The computer-readable storage medium may be a built-in medium installed inside a computer main body or removable medium arranged so that it can be separated from the computer main body.

Further, such programs, when recorded on computer-readable storage media, may be readily stored and distributed. The storage medium, as it is read by a computer, may enable the method(s) disclosed herein, in accordance with an exemplary embodiment of the present invention.

Therefore, the methodologies and systems of example embodiments of the present invention can be implemented in hardware, software, firmware, or a combination thereof. Embodiments may be implemented in software or firmware that is stored in a memory and that is executed by a suitable instruction execution system. These systems may include any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of at least one example embodiment of the present invention in which functions may be executed out of order from that shown or discussed, including substantially concurrently or in reverse order, depending on the functionality involved, as would be understood by those reasonably skilled in the art of the present invention.

Any program which would implement functions or acts noted in the figures, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium, upon which the program is printed, as the program can be electronically captured, via for instance optical scanning of the paper or other medium, then compiled, interpreted or otherwise processed in a suitable manner if necessary, and then stored in a computer memory. In addition, the scope of the present invention includes embodying the functionality of the preferred embodiments of the present invention in logic embodied in hardware or software-configured mediums.

It should be emphasized that the above-described embodiments of the present invention, particularly, any detailed discussion of particular examples, are merely possible examples of implementations, and are set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A method for creating stereoscopic effect in 3D animation in a shot, comprising:
    placing a stereo system screen (zps) into a scene for a desired effect;
    automatically calculating an inter-axial separation between cameras so that background parallax matches a constant predetermined value;
    identification of and compensation for at least one first foreground object according to one or more of:
    adjusting the zps to accommodate for smaller parallax in objects near a virtual camera followed by a return to automatically calculating an inter-axial separation between cameras so that background parallax matches a constant predetermined value;
    multi-rigging the shot so that foreground objects are isolated on their own camera rig, with compression of volume; and
    isolating foreground objects and treating them separately in post-production to reduce their volume; and
    further comprising determining maximum parallax in 3D animation, comprising:
    identifying a second object in a first frame at a threshold distance indicative of a parallax change; and
    setting an object parallax change value for said second object as a corresponding value for plural or all objects at and further than such distance; and
    publishing stereo camera rig settings into a pipeline, with scene elements placed in shot to maximize stereo effect.

2. A method for creating stereoscopic effect in 3D animation in a shot in accordance with claim 1, further comprising:
    emulation of multi-cam rig in 3D animation, comprising:
    setting up a single camera rig set up;
    calculating a base curve representing parallax change over zdepth; and
    redefining a portion of the base curve for one or more objects to create a 3D effect.

3. A method in accordance with claim 2, further comprising redefining the inter-axial value for a left-eye camera.

4. A method in accordance with claim 2, wherein such calculation is made according to: $y=a/z+b$, where y is parallax, z is geometry depth, a is a value calculated using interaxial and focal length, and b is a value calculated using zps depth.

5. A method for creating stereoscopic effect in 3D animation in a shot in accordance with claim 2, further comprising:
   correcting for holes created by missing pixel information from a left camera perspective in 3D animation, comprising:
   identifying holes created by missing pixel information from a left camera perspective;
   implementing one or more of the following hole-filling techniques:
      pixel translating by copying an entire original image, translating the image slightly to the left or right, and layering underneath the original image;
      dilate filling by spreading color from one pixel to surrounding neighbors and layering underneath the original image; and
      side sampling by directly pulling color information from pixels nearest to a hole on the left and right of said hole; and
   applying results from one or more of the above techniques to fill holes in said image.

6. A method for creating stereoscopic effect in 3D animation in a shot in accordance with claim 1, further comprising:
   real-time compositing of multiple stereo camera views in 3D animation, comprising:
   setting up a multi-rig configuration with set geometry isolated and assigned to groupings as a function of depth, with one grouping per stereo camera rig;
   compositing multiple stereo camera views in real time on a stereo view panel using mutipacking features; and
   adding or removing additional depth from parts of a shot and viewing in real time.

7. A method for creating stereoscopic effect in 3D animation in a shot in accordance with claim 1, further comprising:
   representation of stereo effect on a non-stereoscopic monitor in 3D animation, comprising:
   identifying key distances away from a stereo pair (stereo rig) of cameras based on details of the stereo rig;
   defining perpendicular planes at such key distances from the stereo rig as a function of such details, including one or more of:
      defining a stereo screen (zps) plane;
      defining a stereo safe plan;
      defining a stereo action safe plane;
      providing a user-defined plane; and
      defining a parallax falloff plan.

8. A method in accordance with claim 7, further comprising defining a volume bounded by the camera's frustum and the two stereo planes, the stereo action safe plane and the parallax fall off plane; and rendering objects with this volume separately from each camera in the stereo pair.

9. A method for creating stereoscopic effect in 3D animation in a shot in accordance with claim 1, further comprising:
   producing a digital contact sheet created for viewing in 3D animation, comprising:
   identifying frames produced for a shot;
   using compositing software, pulling selected frames from a show database into a digital contact sheet; and
   updating said digital contact sheet based upon recent produced frames.

10. A method in accordance with claim 9, further comprising pulling frames from a monoscopic pipeline for comparison with stereo frames.

* * * * *